(12) United States Patent
Machida et al.

(10) Patent No.: US 10,404,032 B2
(45) Date of Patent: Sep. 3, 2019

(54) OPTICAL POWER MONITORING DEVICE AND LASER APPARATUS

(71) Applicant: FANUC CORPORATION, Yamanashi (JP)

(72) Inventors: Hisatada Machida, Yamanashi (JP); Hiroshi Takigawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/950,304

(22) Filed: Apr. 11, 2018

(65) Prior Publication Data
US 2018/0309262 A1  Oct. 25, 2018

(30) Foreign Application Priority Data

Apr. 20, 2017 (JP) .................. 2017-083790

(51) Int. Cl.
*H01S 3/13* (2006.01)
*H01S 3/131* (2006.01)
(Continued)

(52) U.S. Cl.
CPC .......... *H01S 3/1305* (2013.01); *H01S 3/1312* (2013.01); *G02B 6/255* (2013.01); *G02B 6/262* (2013.01); *G02B 6/4249* (2013.01); *G02B 6/4286* (2013.01); *G02B 6/4295* (2013.01); *G02B 6/4296* (2013.01);
(Continued)

(58) Field of Classification Search
CPC ... H01S 3/1305; H01S 3/2383; G02B 6/4249; G02B 6/4295; G02B 6/4286; G02B 6/255
See application file for complete search history.

(56) References Cited

U.S. PATENT DOCUMENTS 4,076,375 A  2/1978 Muska et al.
5,343,542 A * 8/1994 Kash ................. G02B 6/12007
                                                372/45.01
(Continued)

FOREIGN PATENT DOCUMENTS

JP  2000-147325 A  5/2000
JP  2005-148180 A  6/2005
(Continued)

OTHER PUBLICATIONS

An Office Action mailed by the Japanese Patent Office dated Jan. 8, 2019, which corresponds to Japanese Patent Application No. 2017-083790 and is related to U.S. Appl. No. 15/950,304.

*Primary Examiner* — Xinning(Tom) Niu
(74) *Attorney, Agent, or Firm* — Studebaker & Brackett PC

(57) ABSTRACT

An optical power monitoring device detects an optical power propagating through an optical fiber including at least a core and a cladding. The optical power monitoring device includes: a first optical fiber; a second optical fiber having a larger core diameter than the first optical fiber; a connection part where an end surface of the first optical fiber and an end surface of the second optical fiber are spliced; a first leakage part for leakage of a beam from the first optical fiber to the outside; a second leakage part for leakage of a beam from the second optical fiber to the outside; a first photodetector that detects an optical power leaking from the first leakage part; and a second photodetector that detects an optical power leaking from the second leakage part.

16 Claims, 19 Drawing Sheets

(51) Int. Cl.
G02B 6/255 (2006.01)
G02B 6/42 (2006.01)
H01S 3/23 (2006.01)
H01S 3/00 (2006.01)
H01S 3/10 (2006.01)
G02B 6/26 (2006.01)

(52) U.S. Cl.
CPC ......... *H01S 3/0064* (2013.01); *H01S 3/10069* (2013.01); *H01S 3/2383* (2013.01)

(56) References Cited

U.S. PATENT DOCUMENTS

| | | | | |
|---|---|---|---|---|
| 5,717,804 | A * | 2/1998 | Pan | G02B 6/2552 385/37 |
| 6,016,218 | A * | 1/2000 | Jo | H01S 3/094003 359/341.33 |
| 6,805,497 | B1 * | 10/2004 | Ishikawa | G02B 6/03694 385/96 |
| 2001/0035750 | A1 * | 11/2001 | Murphy | G01R 33/028 324/260 |
| 2009/0135868 | A1 * | 5/2009 | Ishibashi | H01S 5/06832 372/38.02 |
| 2011/0140011 | A1 * | 6/2011 | Uchida | G01M 11/35 250/559.01 |

FOREIGN PATENT DOCUMENTS

| | | |
|---|---|---|
| JP | 2005-208239 A | 8/2005 |
| JP | 2014-211516 A | 11/2014 |
| JP | 2015-022129 A | 2/2015 |
| JP | 2015-159195 A | 9/2015 |
| JP | 2016-076598 A | 5/2016 |
| JP | 2016-513295 A | 5/2016 |
| JP | 2017-021099 A | 1/2017 |

* cited by examiner

OPTICAL POWER MONITORING DEVICE AND LASER APPARATUS

This application is based on and claims the benefit of priority from Japanese Patent Application No. 2017-83790, filed on 20 Apr. 2017, the content of which is incorporated herein by reference.

BACKGROUND OF THE INVENTION

Field of the Invention

The present invention relates to an optical power monitoring device installed at a point along an optical fiber for propagation of a laser beam, capable of passing a beam output from a laser oscillator at low loss, and capable of detecting distinguishably a reflected beam having propagated through a core and a reflected beam having propagated through a cladding, which propagate in a direction opposite an output direction and have different effects to damage on the laser oscillator, etc. The present invention also relates to a high-performance and highly-reliable laser apparatus including the optical power monitoring device, capable of detecting a reflected beam with high accuracy and feeding the detected reflected beam back to control over laser beam output properly, and insusceptible to damage by a reflected beam while maintaining high laser machining performance.

Related Art

When a laser output beam from a laser oscillator is caused to propagate through an optical fiber, guided to a laser beam output end such as a machining head connected to the optical fiber, and then applied to a laser machining target (workpiece), a reflected beam of the laser beam reflected from a surface of the workpiece returns to the laser beam output end at the optical fiber, propagates through the interior of the optical fiber in a direction opposite the direction of the laser output beam, and then returns to the laser oscillator. If this reflected beam has large power, the reflected beam may damage the optical fiber or the laser oscillator. This has been handled by detecting the optical power of the reflected beam. If the reflected beam has propagated through a cladding of the optical fiber, the reflected beam causes temperature increase or burning of a protection coating of the optical fiber. By contrast, if the reflected beam has propagated through a core of the optical fiber, the reflected beam returns to the laser oscillator to cause damage on the laser oscillator, etc. In this way, the reflected beam having propagated through the core and the reflected beam having propagated through the cladding exert influence in different ways. Hence, the respective powers of the reflected beam having propagated through the core and the reflected beam having propagated through the cladding should be detected distinguishably. However, an optical power monitoring device installable at a point along the optical fiber connecting the laser oscillator and the laser beam output end has had difficulty, particularly in detecting the reflected beam having propagated through the core with high accuracy. An optical power monitoring device not installable at a point along the optical fiber connecting the laser oscillator and the laser beam output end is not capable of detecting a reflected beam before the reflected beam reaches the laser oscillator to be damaged by the reflected beam. This has caused a problem of failing to prevent damage on the laser oscillator sufficiently.

Removing a protection coating from an optical fiber and detecting a beam leaking from a part without the protection coating has conventionally been done for detecting an optical power propagating through the optical fiber. However, a beam propagating through a core of the optical fiber generally leaks in a small amount. Hence, it has been difficult to detect a reflected beam with high accuracy propagating through the core, so that various actions have been taken.

For example, patent document 1 discloses an optical power monitoring device where cores are fused while being displaced axially from each other to form an axially displaced fused fiber, and a beam leaking from the core at a fused position is output to the outside of the fiber, thereby receiving an optical power having propagated through the core. In this case, however, beams having propagated through the core in both directions leak in the substantially same proportion from the core to a cladding. This optical power monitoring device is usable for purposes such as communication where an optical power propagating through an optical fiber is small. However, if this optical power monitoring device is used for the purpose of laser machining involving an enormously large optical power propagating through an optical fiber, a proportion of leakage is increased not only for a reflected beam propagating through the core but also for a laser output beam propagating through the core. This causes not only the problem of increasing loss of the laser output beam but also the problem of excessively increasing the temperature of a leakage part or that of a protection coating of the optical fiber, etc. due to the leaking beam. Conversely, if the proportion of an optical power leaking from the core at the fused position is reduced by a method such as reducing the axial displacement, the proportion of leakage of a reflected beam propagating through the core in a direction opposite the direction of the laser output beam is reduced. This makes it difficult to detect the optical power of the leaking beam of the reflected beam propagating through the core with high accuracy. This optical power monitoring device also finds difficulty in detecting a reflected beam having propagated through the cladding and a reflected beam having propagated through the core distinctively from each other.

Patent document 2 discloses a photodetector where a leakage optical fiber having a different refractive index at a core is connected to a point along an optical fiber to detect a beam leaking from a part of the connection between the optical fibers. However, this photodetector has the same problem as the technique described in patent document 1, as beams propagating through the core in both directions leak in the substantially same proportion from the core to a cladding.

Patent document 3 discloses an optical power monitoring device where a part of connection between a first optical fiber and a second optical fiber and a region of a predetermined range of the second optical fiber from the connection part are covered with a low refractive index resin layer having a lower refractive index than a cladding of the second optical fiber. A range except the range covered with the low refractive index resin layer is covered with a high refractive index resin layer having a refractive index equal to or higher than that of the cladding of the second optical fiber. This optical power monitoring device includes optical detection means that detects a beam passing through the high refractive index resin layer. According to patent document 3, by the presence of the low refractive index resin layer, this optical power monitoring device becomes capable of detecting a beam leaking from the connection part with high sensitivity, even with the optical detection means arranged separated from the connection part. Separating the optical detection means from the connection part makes it possible to reduce influence by a scattering beam leaking from the connection part and being reflected from a protection coating, etc. In this way, a reflected beam power and an output beam power can be measured correctly. However, patent document 3 does not provide a solution to the problem in that beams propagating through a core in both directions leak in the substantially same proportion from the core to a cladding at the connection part. Further, patent document 3 does not disclose a technique of detecting a reflected beam having propagated through the cladding and a reflected beam having propagated through the core distinctively from each other.

Patent document 4 discloses a fiber laser apparatus including an optical power monitoring device and an arithmetic unit. The optical power monitoring device includes: a first photodetector arranged closer to an output side of an output beam than a point of connection between a first optical fiber and a second optical fiber; and a second photodetector arranged closer to an input side of the output beam than the connection point and used for detecting a reflected beam leaking from the connection point. The arithmetic unit performs arithmetic operation for calculating a reflected beam power by eliminating influence by the output beam from a result of detection obtained from the second photodetector using a detection result obtained in advance from the optical power monitoring device in a situation without a reflected beam. However, patent document 4 also does not provide a solution to the problem in that beams propagating through a core in both directions leak in the substantially same proportion from the core to a cladding at the connection point. Further, patent document 4 also does not disclose a technique of detecting a reflected beam having propagated through the cladding and a reflected beam having propagated through the core distinctively from each other.

Patent document 5 discloses an optical power monitoring device including a cladding beam removal part, a leakage part for causing part of a beam propagating through a core to leak from the core to a cladding, and a light-receiving part for receiving a beam leaking from the cladding arranged in this order viewed in a traveling direction of a beam in an optical fiber. Patent document 5 discloses a bent section where the optical fiber is bent into a curve as a specific shape of the leakage part. In this optical power monitoring device, the cladding beam removal part is provided before the leakage part to allow detection of a beam having propagated through the core distinguishably from a beam having propagated through the cladding. Like the foregoing leakage part formed from the part of connection between the optical fibers, this leakage part causes beams propagating through the interior of the core in both directions to leak in the substantially same proportion. Hence, to prevent excessive leakage of a laser output beam, the proportion (ratio) of a leaking beam power leaking from the core to the cladding should be controlled at a low level relative to a propagating optical power. This forces reduction in the leaking beam power of a reflected beam propagating through the core in a direction opposite the direction of the laser output beam in this optical power monitoring device, so that the difficulty in detecting a reflected beam with high accuracy propagating through the core is left unsolved.

Patent Document 1: Japanese Unexamined Patent Application, Publication No. 2005-148180

Patent Document 2: Japanese Unexamined Patent Application, Publication No. 2014-211516

Patent Document 3: Japanese Unexamined Patent Application, Publication No. 2015-159195

Patent Document 4: Japanese Unexamined Patent Application, Publication No. 2016-76598

Patent Document 5: Japanese Unexamined Patent Application, Publication No. 2017-21099

SUMMARY OF THE INVENTION

As described above, in a laser apparatus where a laser output beam from a laser oscillator is caused to propagate through an optical fiber, guided to a laser beam output end such as a machining head connected to the optical fiber, and then applied to a workpiece, the optical fiber, the laser oscillator, etc. may be damaged if a reflected beam reflected from a surface of the workpiece and propagating through the interior of the optical fiber in a direction opposite the direction of the laser output beam has large power. A reflected beam having propagated trough a cladding causes temperature increase or burning, etc. of a protection coating of the optical fiber. Meanwhile, a reflected beam having propagated through the core returns to the laser oscillator and damages the laser oscillator, etc. In this way, the reflected beam having propagated through the core and the reflected beam having propagated through the cladding exert influence in different ways. Hence, an optical power monitoring device is required to be capable of detecting the power of a reflected beam having propagated through the core and the power of a reflected beam having propagated through the cladding distinctively from each other with high accuracy or high sensitivity.

At the same time, the optical power monitoring device is required to satisfy the essential conditions of reducing the loss of a laser output beam caused by passage through the optical power monitoring device and ensuring reliability sufficient for a laser output beam power of ten kilowatts or more. To prevent a reflected beam from propagating to reach the laser oscillator and damaging the laser oscillator, the optical power monitoring device is also desirably installed at a point along an optical fiber closer to a laser beam output end than the laser oscillator and capable of detecting the optical power of the reflected beam. The optical power monitoring device is also desirably capable of detecting not only a reflected beam but also detecting a laser output beam with high accuracy in the absence of a reflected beam. Additionally, the optical power monitoring device certainly desirably has high resistance to environment such as vibration with a simple and inexpensive configuration.

Thus, a first problem to be solved by the present invention is to provide a highly-reliable optical power monitoring device installable at a point along an optical fiber for propagation of a laser output beam having large optical power, capable of passing a laser output beam propagating through a core of the optical fiber at low loss, and capable of detecting with high accuracy (high sensitivity) and distinguishably a reflected beam having propagated through the core and a reflected beam having propagated through a cladding, which propagate through the optical fiber in a direction opposite a propagation direction of the laser output beam.

A second problem to be solved by the present invention is to provide a high-performance and highly-reliable laser apparatus that causes a laser output beam from a laser oscillator to propagate through the interior of an optical fiber and guides the laser output beam to a laser beam output end, and includes the foregoing optical power monitoring device to become capable of producing high output, capable of emitting a laser output beam from the laser oscillator at low loss, capable of monitoring the power of a reflected beam propagating through the core and the power a reflected beam propagating through the cladding with high accuracy and distinctively from each other during laser machining, capable of feeding a result of the monitoring back to control over laser beam output properly, and insusceptible to damage by a reflected beam while maintaining high laser machining performance.

As described above, the present invention is intended to provide a highly-reliable optical power monitoring device installable at a point along an optical fiber, capable of passing a laser output beam at low loss, and capable of detecting a reflected beam having propagated through a core and a reflected beam having propagated through a cladding with high accuracy and distinctively from each other. The present invention is also intended to provide a high-performance and highly-reliable laser apparatus that feeds a result of optical power monitoring back to control over laser beam output properly and is insusceptible to damage by a reflected beam while maintaining high laser machining performance.

(1) An optical power monitoring device according to the present invention is an optical power monitoring device (optical power monitoring device 1 described later, for example) that detects an optical power propagating through an optical fiber including at least a core (core 21, 31 described later, for example) and a cladding (cladding 22, 32 described later, for example). The optical power monitoring device comprises: a first optical fiber (first optical fiber 2 described later, for example); a second optical fiber (second optical fiber 3 described later, for example) having a larger core diameter than the first optical fiber; a connection part (connection part 4 described later, for example) where an end surface of the first optical fiber and an end surface of the second optical fiber are connected; a first leakage part (first leakage part 23 described later, for example) for leakage of a beam from the first optical fiber to the outside; a second leakage part (second leakage part 33 described later, for example) for leakage of a beam from the second optical fiber to the outside; a first photodetector (first photodetector 5 described later, for example) that detects an optical power leaking from the first leakage part; and a second photodetector (second photodetector 6 described later, for example) that detects an optical power leaking from the second leakage part.

(2) In the optical power monitoring device described in (1), the first leakage part and the second leakage part may each include a protection coating removed part (protection coating removed part 25, 35 described later, for example) where a surface of the cladding is exposed by removing a protection coating from the first optical fiber and the second optical fiber.

(3) In the optical power monitoring device described in (2), each of the first photodetector and the second photodetector may have a light-receiving surface provided at a position facing the protection coating removed part.

(4) In the optical power monitoring device described in (2) or (3), the surface of the cladding exposed from the protection coating removed part may be subjected at least partially to cladding beam removal process for letting a beam propagating through the cladding out of the cladding.

(5) In the optical power monitoring device described in any one of (1) or (4), at least one of the first leakage part and the second leakage part may include a bent section (bent section 26 described later, for example).

(6) In the optical power monitoring device described in any one of (1) or (5), at least one of the first photodetector and the second photodetector may include multiple photodetectors.

(7) In the optical power monitoring device described in (6), the multiple photodetectors may include photodetectors having different wavelength sensitivities.

(8) In the optical power monitoring device described in any one of (1) to (7), at least one of the first photodetector and the second photodetector may be a photodiode.

(9) The optical power monitoring device described in any one of (1) to (8) may further comprise a heat dissipation member (heat dissipation member 7 described later, for example). At least one of the first optical fiber, the second optical fiber, the connection part, the first leakage part, the second leakage part, the first photodetector, and the second photodetector may thermally be connected to the heat dissipation member.

(10) The optical power monitoring device described in any one of (1) to (9) may further comprise one or more temperature detectors (temperature detector 8 described later, for example). At least one of the first photodetector and the second photodetector may thermally be connected to the temperature detector.

(11) A laser apparatus according to the present invention (laser apparatus 100 described later, for example) comprises: the optical power monitoring device described in any one of (1) to (10); a laser oscillator; an output optical fiber (output optical fiber 102 described later, for example) for propagation of a laser output beam output from the laser oscillator toward a laser beam output end; a laser power supply (laser power supply 103 described later, for example) that supplies driving power to the laser oscillator; and a control unit (control unit 104 described later, for example) that receives a detection signal output from each of the first photodetector and the second photodetector in the optical power monitoring device, and outputs an output command value to the laser power supply instructing supply of driving power to the laser oscillator. The optical power monitoring device is installed at a point along the output optical fiber in order for a laser output beam output from the laser oscillator to propagate in a direction from the first optical fiber toward the second optical fiber.

(12) The laser apparatus described in (11) (laser apparatus 200 described later, for example) may further comprise a recording unit (recording unit 107 described later, for example) and a calculation unit (calculation unit 108 described later, for example). The recording unit may contain a first detection characteristic and a second detection characteristic recorded in advance. The first detection characteristic shows a relationship of a detection value obtained from the first photodetector with an output command value from the control unit in the absence of a reflected beam from a workpiece as a laser machining target. The second detection characteristic shows a relationship of a detection value obtained from the second photodetector with the output command value from the control unit in the absence of a reflected beam from the workpiece. The calculation unit may calculate a first reflected beam power during laser machining based on a detection value obtained from the first photodetector relative to the output command value from the control unit and the first detection characteristic, and a second reflected beam power during the laser machining based on a detection value obtained from the second photodetector relative to the output command value from the control unit and the second detection characteristic. At least one threshold may be set individually for each of the first reflected beam power and the second reflected beam power calculated by the calculation unit. If the threshold is exceeded, the control unit may instruct interruption of beam output or operate so as to change the output command value by following a predetermined standard.

(13) In the laser apparatus described in (11) or (12), the laser oscillator may include multiple laser oscillators. The laser apparatus may comprise a beam combiner (beam combiner 109 described later, for example) that couples multiple laser output beams optically output from corresponding ones of the multiple laser oscillators. The optical power monitoring device may be installed at a point along the output optical fiber in order for a laser output beam output from the beam combiner toward the laser beam output end to propagate in the direction from the first optical fiber toward the second optical fiber.

The optical power monitoring device provided by the present invention is a highly-reliable optical power monitoring device installable at a point along an optical fiber, capable of passing a laser output beam at low loss, and capable of detecting with high accuracy and distinguishably a reflected beam having propagated through a core and a reflected beam having propagated through a cladding. The laser apparatus provided by the present invention is a high-performance and highly-reliable laser apparatus that feeds a result of optical power monitoring back to control over laser beam output properly to become insusceptible to damage by a reflected beam while maintaining high laser machining performance.

DETAILED DESCRIPTION OF THE INVENTION

Figure 1:
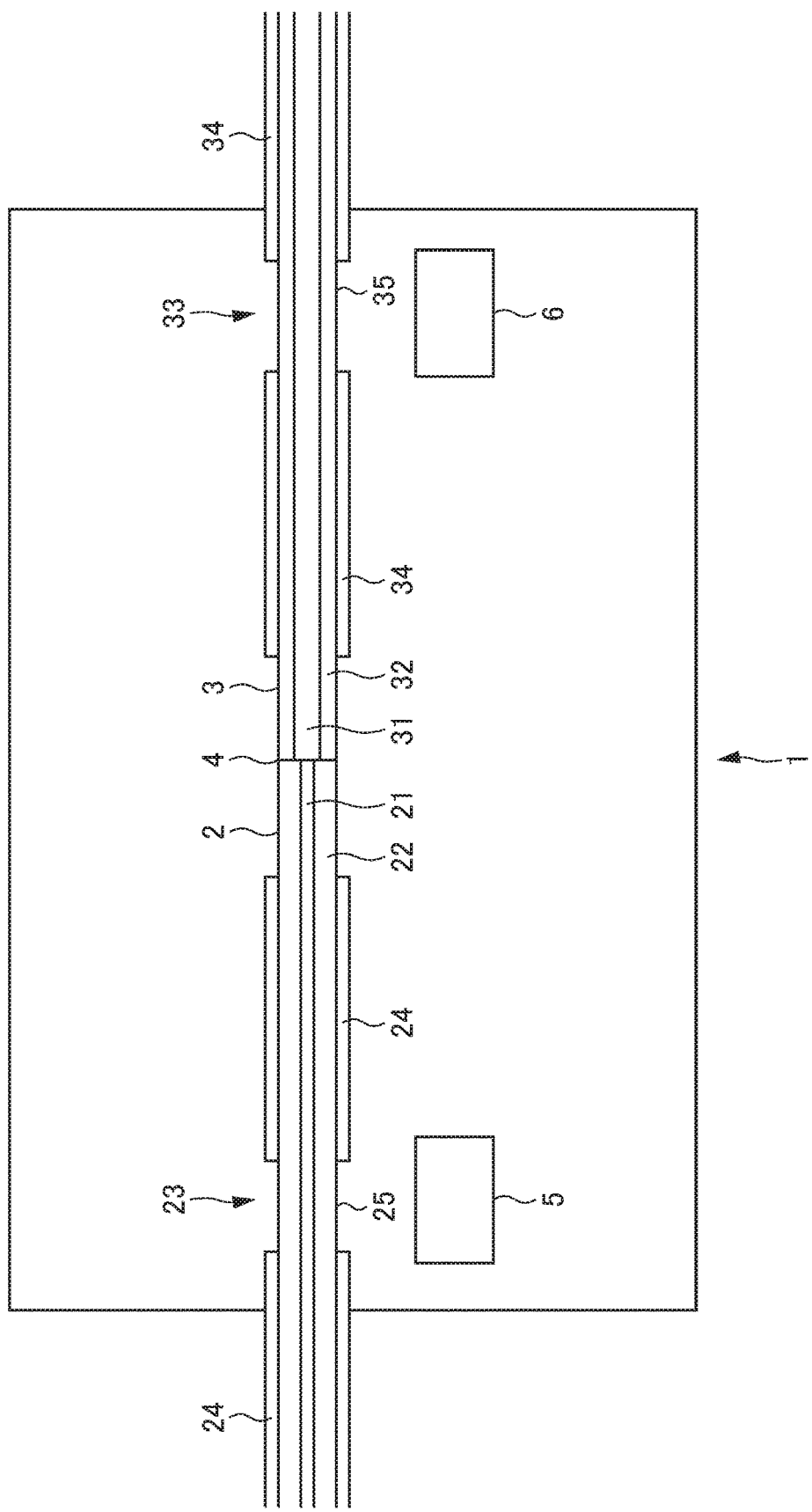
FIG. 1 is a block diagram showing the conceptual configuration of an optical power monitoring device according to an embodiment of the present invention.

An embodiment of an optical power monitoring device and an embodiment of a laser apparatus according to the present invention will be described below by referring to the drawings. Members common between drawings are identified by the same reference sign. Components shown in different drawings and identified by the same reference sign are to fulfill the same function. To facilitate illustrations in the drawings, scales are changed appropriately.

FIG. 1 is a block diagram showing the conceptual configuration of an optical power monitoring device according to an embodiment of the present invention. An optical fiber section is shown in a schematic sectional view. An optical power monitoring device 1 includes a first optical fiber 2 including at least a core 21 and a cladding 22 covering the outer circumference of the core 21, and a second optical fiber 3 including at least a core 31 and a cladding 32 covering the outer circumference of the core 31. The first optical fiber 2 and the second optical fiber 3 are spliced at respective end surfaces to form a connection part (splice) 4. The first optical fiber 2 has a first leakage part 23 provided near the connection part 4 for leakage of a beam to the outside of the cladding 22 of the first optical fiber 2. The second optical fiber 3 has a second leakage part 33 provided near the connection part 4 for leakage of a beam to the outside of the cladding 32 of the second optical fiber 3. A first photodetector 5 is arranged at the first leakage part 23. The first photodetector 5 receives and detects an optical power leaking from the first leakage part 23, and outputs a result of the detection. A second photodetector 6 is arranged at the second leakage part 33. The second photodetector 6 receives and detects an optical power leaking from the second leakage part 33, and outputs a result of the detection. All these parts may be housed entirely in a case for preventing leakage of a laser beam to the outside or for blocking entry of a beam from the outside.

The second optical fiber 3 has a larger core diameter than the first optical fiber 2. Thus, the connection at the connection part 4 is such that at least a part of an inner circumferential side of the end surface of the cladding 22 of the first optical fiber 2 contacts the end surface of the core 31 of the second optical fiber 3. The core diameter of the second optical fiber 3 may be in a range from several times to ten or more times the core diameter of the first optical fiber 2. However, this is not the only range of the core diameter of the second optical fiber 3. As shown in the drawings, the first optical fiber 2 and the second optical fiber 3 may have the substantially same outer diameter. However, the first optical fiber 2 and the second optical fiber 3 do not always have the substantially same outer diameter. Meanwhile, the core diameter of the second optical fiber 3 is smaller than the outer diameter of the cladding 22 of the first optical fiber 2. Thus, the connection at the connection part 4 is such that at least a part of an inner circumferential side of the end surface of the cladding 32 of the second optical fiber 3 contacts the end surface of the cladding 22 of the first optical fiber 2. The connection part 4 may be formed by making abutting contact between the respective end surfaces of the first optical fiber 2 and the second optical fiber 3. In terms of reducing loss of propagation of a beam at the connection part 4, the connection part 4 is preferably formed by splicing the respective end surfaces of the first optical fiber 2 and the second optical fiber 3 by fusing.

Figure 2:
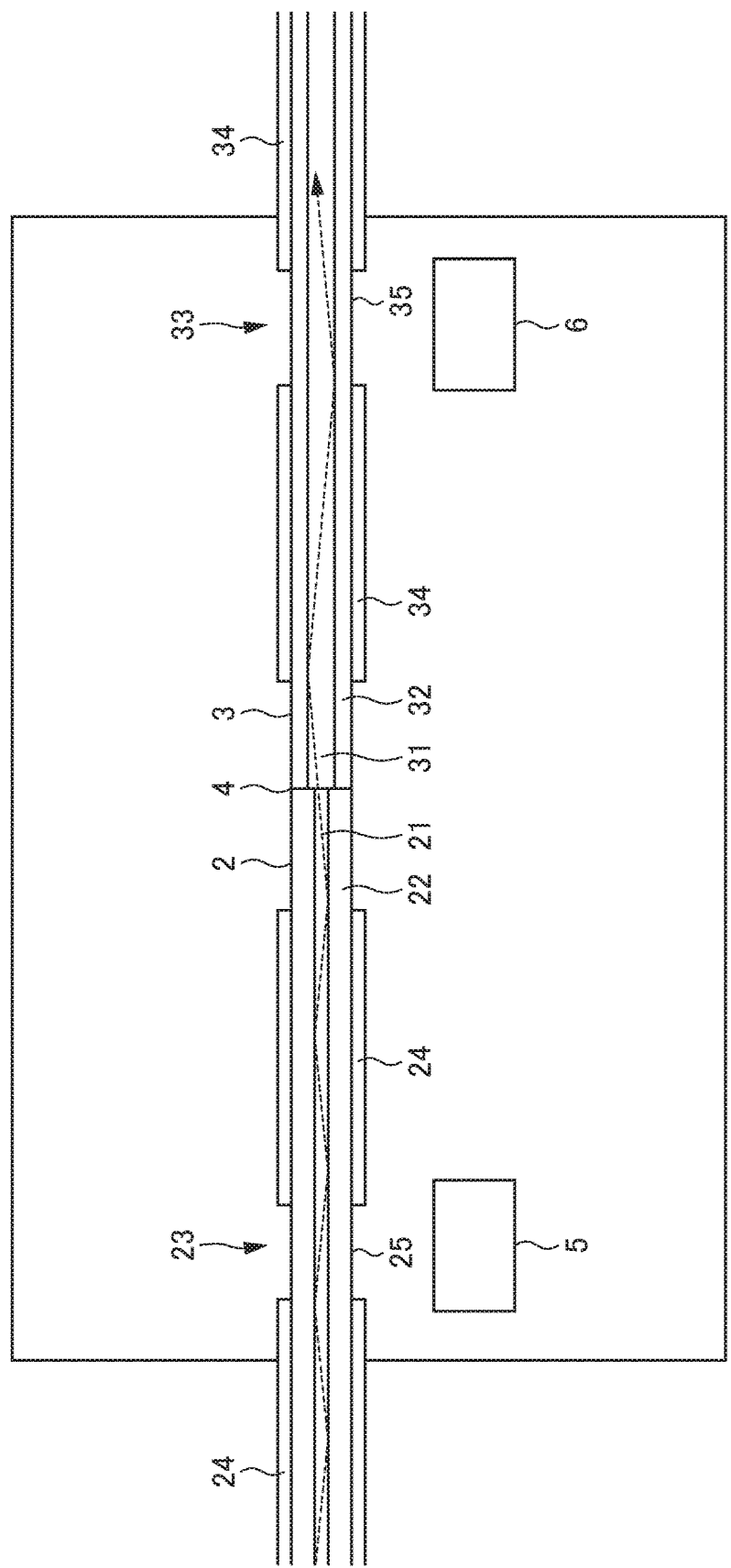
FIG. 2 shows an exemplary beam having propagated through a core in a direction from a first optical fiber toward a second optical fiber indicated by a dotted line added to the configuration of FIG. 1.
Figure 3:
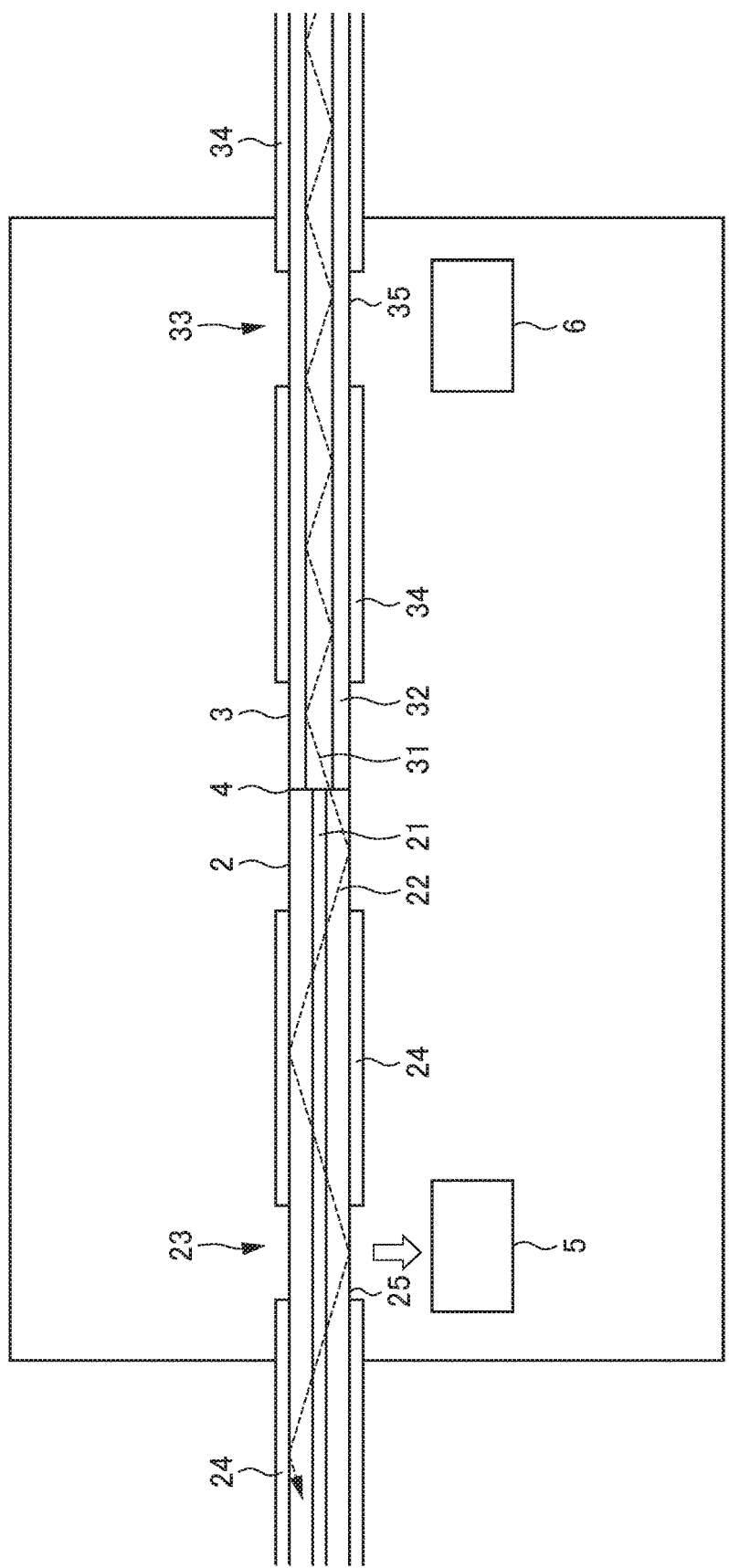
FIG. 3 shows an exemplary beam having propagated through the core in a direction from the second optical fiber toward the first optical fiber indicated by a dotted line added to the configuration of FIG. 1.
Figure 4:
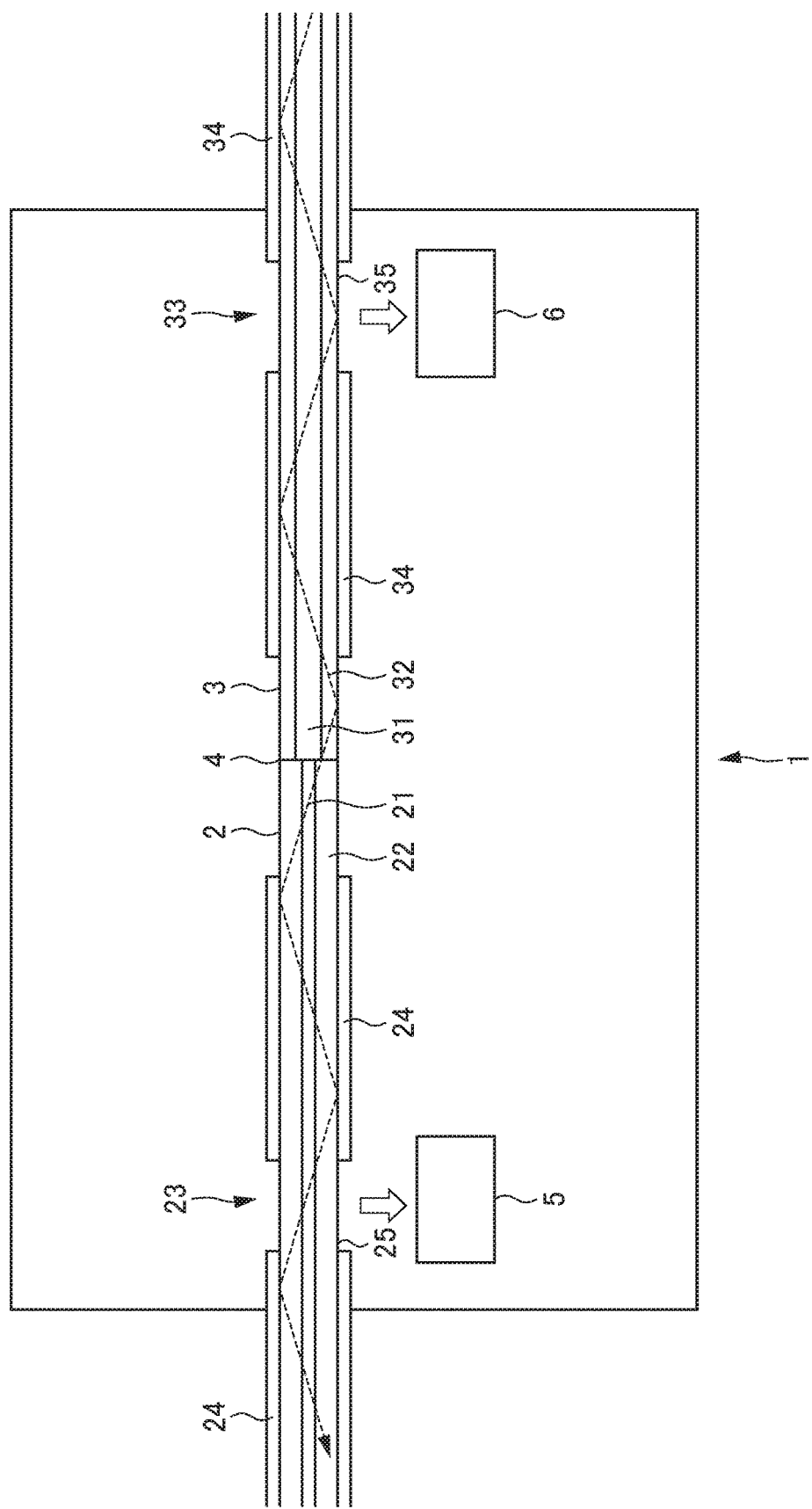
FIG. 4 shows an exemplary beam having propagated through a cladding in the direction from the second optical fiber toward the first optical fiber indicated by a dotted line added to the configuration of FIG. 1.

FIGS. 2 to 4 show how a beam propagates through the first optical fiber 2 and the second optical fiber 3 in the optical power monitoring device 1. FIG. 2 shows an exemplary beam having propagated through the core 21 of the first optical fiber 2 in a direction toward the second optical fiber 3 indicated by a dotted line added to the configuration of FIG. 1. A core diameter increases at the connection part 4. Thus, as shown in FIG. 2, the beam having propagated through the core 21 of the first optical fiber 2 in the direction toward the second optical fiber 3 propagates from the core 21 of the first optical fiber 2 to the core 31 of the second optical fiber 3. When the beam passes through the connection part 4, the proportion of an optical power leaking from the core 21 of the first optical fiber 2 to the cladding 32 of the second optical fiber 3 is low. As a result, the optical power of the beam having propagated in the direction from the core 21 of the first optical fiber 2 toward the second optical fiber 3 is not lost much at the connection part 4 and is allowed to pass through the optical power monitoring device 1 by propagating through the cores 21 and 31. Thus, if the beam having propagated through the core 21 of the first optical fiber 2 in the direction toward the second optical fiber 3 is a laser output beam from a laser apparatus, for example, the laser output beam is allowed to pass through the optical power monitoring device 1 at low loss.

FIG. 3 shows an exemplary beam having propagated through the core 31 of the second optical fiber 3 in a direction toward the first optical fiber 2 indicated by a dotted line added to the configuration of FIG. 1. In FIG. 3, a hollow arrow schematically shows a beam leaking from the first leakage part 23 to the outside of the first optical fiber 2 and entering the first photodetector 5. A core diameter is reduced at the connection part 4. Thus, as shown in FIG. 3, the beam having propagated in the direction from the core 31 of the second optical fiber 3 toward the first optical fiber 2 leaks at the connection part 4 from the core 31 of the second optical fiber 3 to the cladding 22 of the first optical fiber 2, and this leaking beam has a considerably high optical power proportion. The beam having leaked at the connection part 4 from the core 31 of the second optical fiber 3 to the cladding 22 of the first optical fiber 2 propagates through the cladding 22 of the first optical fiber 2, and then leaks from the first leakage part 23 to the outside of the cladding 22 to be detected by the first photodetector 5. The beam leaking at the connection part 4 from the core 31 of the second optical fiber 3 to the cladding 22 of the first optical fiber 2 has a considerably high optical power proportion. Thus, the beam having propagated through the core 31 of the second optical fiber 3 in the direction toward the first optical fiber 2 can be detected with high accuracy by the first photodetector 5.

FIG. 4 shows an exemplary beam having propagated through the cladding 32 of the second optical fiber 3 in a direction toward the first optical fiber 2 indicated by a dotted line added to the configuration of FIG. 1. In FIG. 4, hollow arrows schematically show a beam leaking from the first leakage part 23 to the outside of the first optical fiber 2 and entering the first photodetector 5, and a beam leaking from the second leakage part 33 to the outside of the second optical fiber 3 and entering the second photodetector 6. As shown in FIG. 4, the beam having propagated through the cladding 32 of the second optical fiber 3 in the direction toward the first optical fiber 2 easily leaks at the second leakage part 33 of the second optical fiber 3 from the cladding 32 to the outside of the second optical fiber 3 and is detected with high accuracy by the second photodetector 6. Regarding a beam having propagated through the core 31 of the second optical fiber 3 in the direction toward the first optical fiber 2, substantially no leakage of this beam from the core 31 to the cladding 32 occurs at the position of the second leakage part 33. Thus, the beam having propagated through the core 31 of the second optical fiber 3 in the direction toward the first optical fiber 2 hardly leaks from the second leakage part 33. As a result, the beam having propagated through the core 31 of the second optical fiber 3 in the direction toward the first optical fiber 2 is hardly detected by the second photodetector 6. Meanwhile, the beam having propagated through the cladding 32 of the second optical fiber 3 in the direction toward the first optical fiber 2 may partially propagate through the cladding 22 of the first optical fiber 2 and leak from the first leakage part 23 to the outside of the cladding 22. The first photodetector 5 may also detect this leaking beam. As described above, however, the second photodetector 6 hardly detects the beam having propagated through the core 31 of the second optical fiber 3 in the direction toward the first optical fiber 2. Thus, even if a result of detection by the first photodetector 5 contains a non-negligible amount of contribution by the beam having propagated through the cladding 32 of the second optical fiber 3 and then through the cladding 22 of the first optical fiber 2, this contribution can be calculated easily and influence by this contribution can be eliminated.

Thus, the optical power monitoring device 1 is capable of detecting with high accuracy and distinguishably both an optical power having propagated through the core 31 of the second optical fiber 3 in the direction toward the first optical fiber 2 and an optical power having propagated through the cladding 32 of the second optical fiber 3 in the direction toward the first optical fiber 2. Thus, if a beam having propagated in the direction from the second optical fiber 3 toward the first optical fiber 2 is a reflected beam from a workpiece, etc. propagating in a direction opposite the direction of a laser output beam from a laser apparatus, for example, the optical power monitoring device 1 is capable of detecting with high accuracy and distinguishably the optical power of a reflected beam having propagating through the core 31 of the second optical fiber 3 and the optical power of a reflected beam having propagated through the cladding 32 of the second optical fiber 3.

As shown in FIGS. 1 to 4, the first optical fiber 2 and the second optical fiber 3 have a protection coating 24 and a protection coating 34 respectively formed on the respective outer circumferential surfaces of the first optical fiber 2 and the second optical fiber 3 for blocking or substantially blocking propagation of beams through the interiors of the first optical fiber 2 and the second optical fiber 3. The specific configurations of the first leakage part 23 and the second leakage part 33 are not particularly limited, as long as these configurations allow leakage of beams to the outside of the protection coatings 24 and 34. For example, the first leakage part 23 and the second leakage part 33 may include parts made of a material such as resin allowing passage of a beam and formed at positions of the protection coatings 24 and 34 corresponding to the first leakage part 23 and the second leakage part 33 respectively. However, the first leakage part 23 and the second leakage part 33 preferably have a protection coating removed part 25 and a protection coating removed part 35 respectively where surfaces of the claddings 22 and 32 are exposed by removing the protection coatings 24 and 34 at the corresponding to the first leakage part 23 and the second leakage part 33 respectively. This makes it possible to easily achieve the effect of allowing beams having leaked to the claddings 22 and 32 to further leak to the outside of the first optical fiber 2 and the second optical fiber 3 easily so as to allow detection of these beams by the first photodetector 5 and the second photodetector 6. If the beams having leaked to the claddings 22 and 32 are reflected beams from a workpiece to propagate in a direction opposite the direction of a laser output beam from a laser apparatus, the protection coating removed parts 25 and 35 become functional to prevent the occurrence of trouble such as overheating and burning of the protection coatings 24 and 34 with the beams having leaked to the claddings 22 and 32. In this case, as shown in FIGS. 1 to 4, to prevent the occurrence of trouble such as overheating and burning of the protection coatings 24 and 34 with the beams having leaked to the claddings 22 and 32 at the connection part 4, for example, a predetermined region including the connection part 4 also preferably has a protection coating removed part formed by removing the protection coatings 24 and 34.

As shown in FIGS. 1 to 4, if the first leakage part 23 and the second leakage part 33 are configured to include the protection coating removed parts 25 and 35, the first photodetector 5 and the second photodetector 6 preferably have light-receiving surfaces formed at positions facing the protection coating removed parts 25 and 35 respectively. This allows the first photodetector 5 and the second photodetector 6 to detect beams efficiently leaking from the protection coating removed parts 25 and 35 respectively. In order for the beam leaking from the protection coating removed part 25 or 35 to be efficiently focused on or guided to the light-receiving surface of the first photodetector 5 or the second photodetector 6, an optical part not shown in the drawings for the focusing or guidance of the beam may be arranged between the protection coating removed part 25 and the first photodetector 5 or between the protection coating removed part 35 and the second photodetector 6. The optical part for the focusing or guidance of the beam may also function a beam-transmitting window provided for the light-receiving surface of the first photodetector 5 or the second photodetector 6.

The protection coating removed parts 25 and 35 formed by removing the protection coatings 24 and 34 are at least required to be arranged at positions of the protection coatings 24 and 34 corresponding to the positions of the first photodetector 5 and the second photodetector 6 respectively in order to allow the first photodetector 5 and the second photodetector 6 to detect beams leaking from the first optical fiber 2 and the second optical fiber 3 respectively. Meanwhile, the protection coating removed parts 25 and 35 shown in FIGS. 1 to 4 are formed by removing the protection coatings 24 and 34 of the first optical fiber 2 and the second optical fiber 3 along the entire circumferential surfaces. In this case, mirror reflectors not shown in the drawings may be arranged on the opposite side to the first photodetector 5 and the second photodetector 6 across the protection coating removed parts 25 and 35. This allows a beam leaking from the protection coating removed part 25 or 35 and traveling toward the opposite side to the first photodetector 5 or the second photodetector 6 to enter the light-receiving surface of the first photodetector 5 or the second photodetector 6 efficiently. As a result, the first photodetector 5 and the second photodetector 6 are allowed to achieve detection with higher accuracy. This mirror reflector may have a curved mirror surface in order for a beam leaking from the protection coating removed part 25 or 35 to be focused more efficiently on the light-receiving surface of the first photodetector 5 or the second photodetector 6.

While not shown in the drawings, it is also preferable that a surface of the cladding 22 or 32 exposed from the protection coating removed part 25 or 35 be subjected to cladding beam removal process at least partially performed for effectively letting a beam propagating through the cladding 22 or 32 out of the cladding 22 or 32. As a result of implementation of the cladding beam removal process, a beam propagating through the cladding 22 or 32 is let out of the optical fiber easily to increase the accuracy of detection of the beam propagating through the cladding 22 or 32. If a beam propagating through the cladding 22 or 32 is a beam that might cause overheating and resultant burning of the protection coating 24 or 34, for example, the beam is let out of the optical fiber more easily to achieve the effect of preventing damage on the protection coating 24 or 34. For example, specific methods applicable for the cladding beam removal process include a surface roughening method of producing a slightly roughened condition on the external surface of the cladding 22 or 32, a method of forming fine patterns on the external surface of the cladding 22 or 32, and a method of coating the external surface of the cladding 22 or 32 with resin, etc. having a higher refractive index than the cladding 22 or 32 for causing a leaking beam to pass through.

Figure 5:
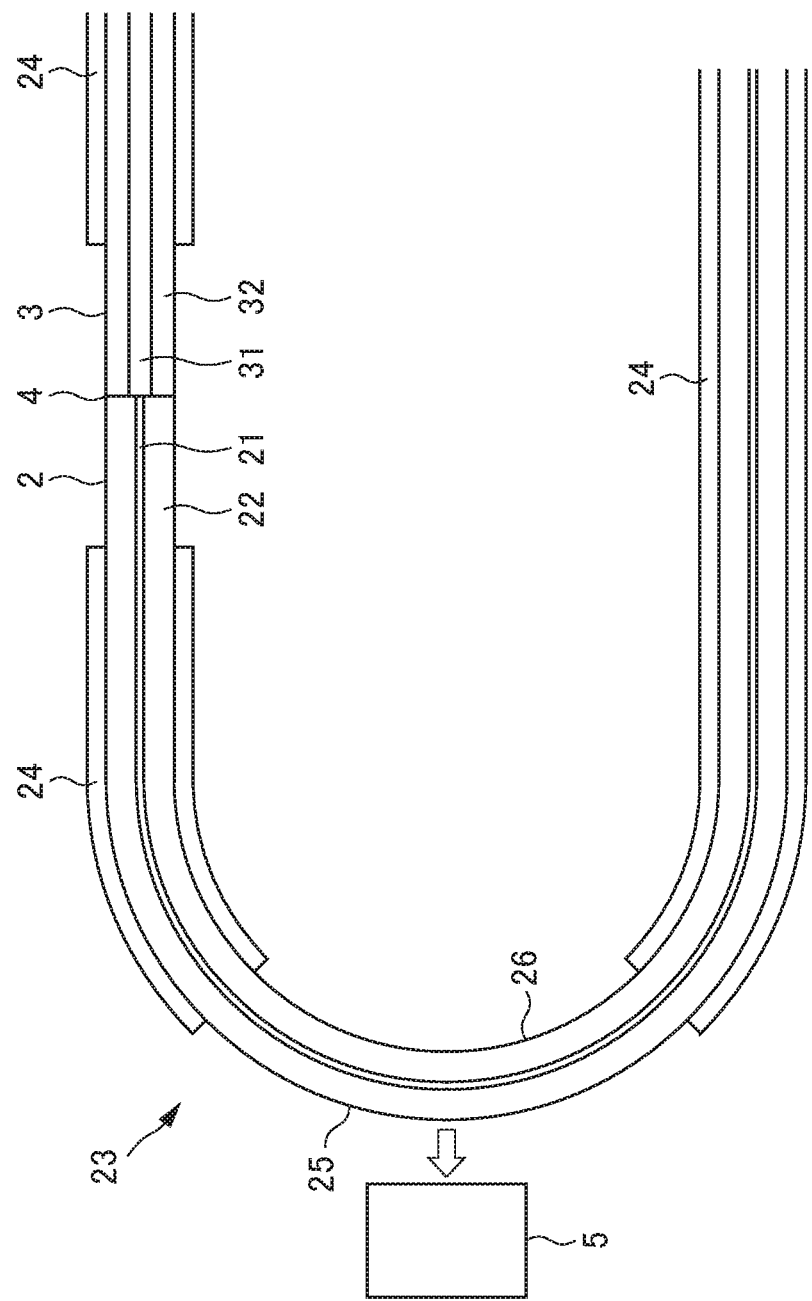
FIG. 5 is a block diagram showing the conceptual configuration of a part of an optical power monitoring device according to a different embodiment of the present invention.

FIG. 5 is a block diagram showing the conceptual configuration of a part of an optical power monitoring device according to a different embodiment of the present invention. An optical fiber section is shown in a schematic sectional view. In FIG. 5, a hollow arrow schematically shows a beam leaking from the first leakage part 23 and entering the first photodetector 5. At least one of the foregoing first leakage part 23 and second leakage part 33 preferably includes a bent section. FIG. 5 shows a related section in the optical power monitoring device with the first leakage part 23 and the second leakage part 33 and where the first leakage part 23 includes a bent section 26. By the provision of the bent section 26, a beam propagating through the interior of the cladding 22 is allowed to leak easily to the outside without performing the foregoing cladding beam removal process on the surface of the cladding 22, thereby increasing the accuracy of detection by the first photodetector 5. The cladding beam removal process may certainly be performed further on the bent section 26. Such a bent section may also be provided to the second leakage part 33.

The bent section 26 shown in FIG. 5 is formed by bending the first optical fiber 2 to about 180 degrees into an arc-like shape about the first leakage part 23. However, this is not the only case. The bent section is only required to be a section of the optical fiber bent into a curve at the position of the first leakage part 23 or the second leakage part 33. Thus, while not shown in the drawings, the bent section may be formed by bending the first leakage part 23 or the second leakage part 33 entirely into a circle, for example. In the presence of the bent section, like the position of the first photodetector 5 and that of the bent section 26 of the first optical fiber 2 relative to each other shown in FIG. 5, the photodetector is at least preferably arranged adjacent to the projecting side (outer circumferential side) of the bent section in order to detect a beam leaking from the cladding 22 or 32 more effectively.

In order to increase a beam at the first leakage part 23 or the second leakage part 33 leaking to the outside of the optical fiber, a second connection part not shown in the drawings may be provided separately from the connection part 4. The second connection part is formed at the first leakage part 23 or the second leakage part 33 by splicing the respective end surfaces of the optical fibers by fusing, for example. The second connection part is not always required to be formed by splicing optical fibers having different core diameters.

Figure 6:
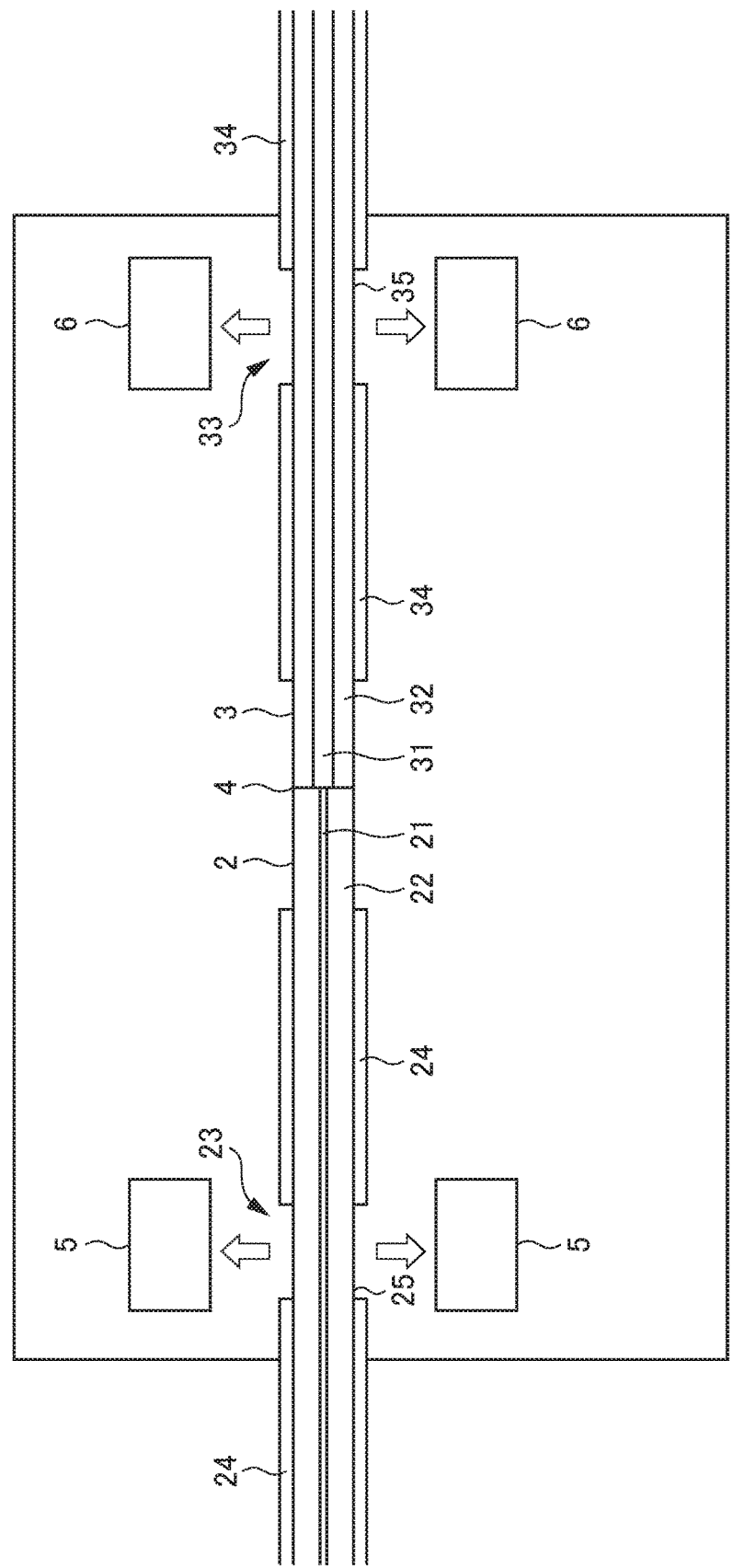
FIG. 6 is a block diagram showing the conceptual configuration of an optical power monitoring device according to a still different embodiment of the present invention.

FIG. 6 is a block diagram showing the conceptual configuration of an optical power monitoring device according to a still different embodiment of the present invention. An optical fiber section is shown in a schematic sectional view. In FIG. 6, hollow arrows schematically show beams leaking from the first leakage part 23 and the second leakage part 33 and entering the first photodetector 5 and the second photodetector 6. In this optical power monitoring device 1, multiple photodetectors are used to form each of the first photodetector 5 and the second photodetector 6. Using the multiple photodetectors for forming the first photodetector 5 or the second photodetector 6 makes it possible to prevent the occurrence of an inaccurate detection result due to deterioration or failure of a photodetector, or various troubles caused by inadequate beam output control based on the inaccurate detection result. This can contribute to reliability increase of a detection result. If multiple photodetectors are used for forming the first photodetector 5 or the second photodetector 6, each of the first photodetector 5 and the second photodetector 6 preferably includes multiple photodetectors as shown in FIG. 6 in terms of increasing the reliability of a detection result further. Meanwhile, only one of the first photodetector 5 and the second photodetector 6 may be formed by multiple photodetectors.

The first leakage part 23 and the second leakage part 33 shown in FIG. 6 include the protection coating removed parts 25 and 35 extending the entire circumferences of the first optical fiber 2 and the second optical fiber 3 respectively. Two first photodetectors 5 are arranged to face each other across the optical fiber, and two second photodetectors 6 are arranged to face each other across the optical fiber. Meanwhile, in the presence of the protection coating removed parts 25 and 35 extending the entire circumferences, three or more photodetectors not shown in the drawings may be provided for one leakage part and arranged in the circumferential direction around the optical fiber, for example. Beams leaking from the optical fiber are not always output isotropically around the optical fiber. In this regard, arranging multiple photodetectors in the circumferential direction around the optical fiber achieves the effect of increasing the accuracy of detection of a leaking beam. The arrangement of multiple photodetectors is not limited to such arrangement in a circumferential direction around the optical fiber. Multiple photodetectors may also be aligned in the axis direction of the optical fiber or may be arranged both in the circumferential direction and the axis direction of the optical fiber.

Figure 7:
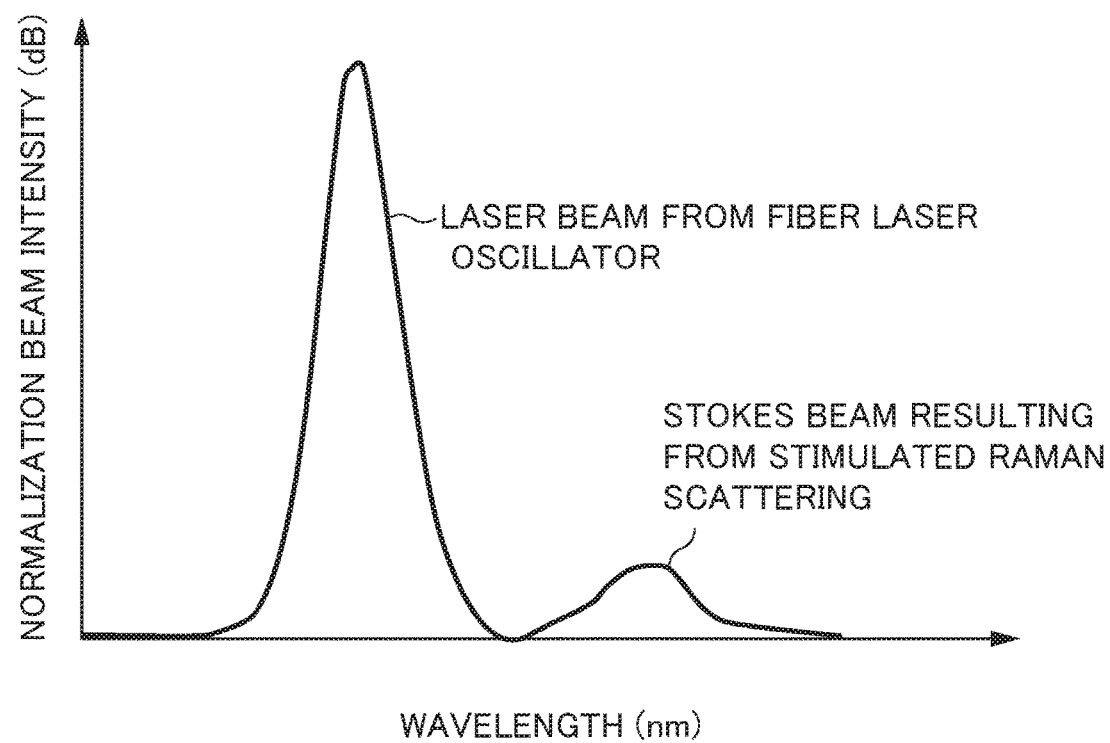
FIG. 7 is a graph showing a relationship between a normalization beam intensity and a wavelength for explaining a Stokes beam resulting from induced Raman scattering in a fiber laser.

If multiple photodetectors are provided for one leakage part, these photodetectors preferably include photodetectors having different wavelength sensitivities. As shown in FIG. 6, if two photodetectors are provided for one leakage part (the first photodetectors 5 for the first leakage part 23 or the second photodetectors 6 for the second leakage part 33), for example, a wavelength sensitivity may be set to differ between these two photodetectors (between the first photodetectors 5 or between the second photodetectors 6) to provide photodetectors having different wavelength sensitivities belonging to the multiple photodetectors. Different wavelength sensitivities may be set by the use of an optical bandpass filter, low-pass filter, or a high-pass filter, for example. By doing so, only a beam in a particular wavelength range can be detected with high sensitivity. For example, like a Stokes beam resulting from induced Raman scattering in a fiber laser shown in FIG. 7, there is a beam more harmful than a reflected beam of a laser output beam from the fiber laser such as a beam to return to an excitation semiconductor laser without being reflected by a fiber bragg grating (FBG) at the fiber laser as a result of wavelength shift and to cause damage on the excitation semiconductor laser, etc. Such a harmful beam can be detected distinctively from a laser output beam or a normal reflected beam to achieve more adequate beam output control.

The specific configurations of the first photodetector 5 and the second photodetector 6 are not particularly limited, as long as these configurations allow receipt and detection of beams leaking from the first leakage part 23 and the second leakage part 33, and output of results of the detections. Meanwhile, at least one of the first photodetector 5 and the second photodetector 6 is preferably a photodiode. The photodiode has higher optical response speed than a photodetector of a type of detecting a beam after converting the beam to heat. High optical response speed allows detection of change in a reflected beam power at high speed, so that the detected change can be fed back to control over beam output at high speed. Thus, if a reflected beam comes from a workpiece to propagate in a direction opposite the direction of a laser output beam from a laser apparatus, damage on a laser oscillator or an optical fiber can be prevented before it happens.

Figure 8:
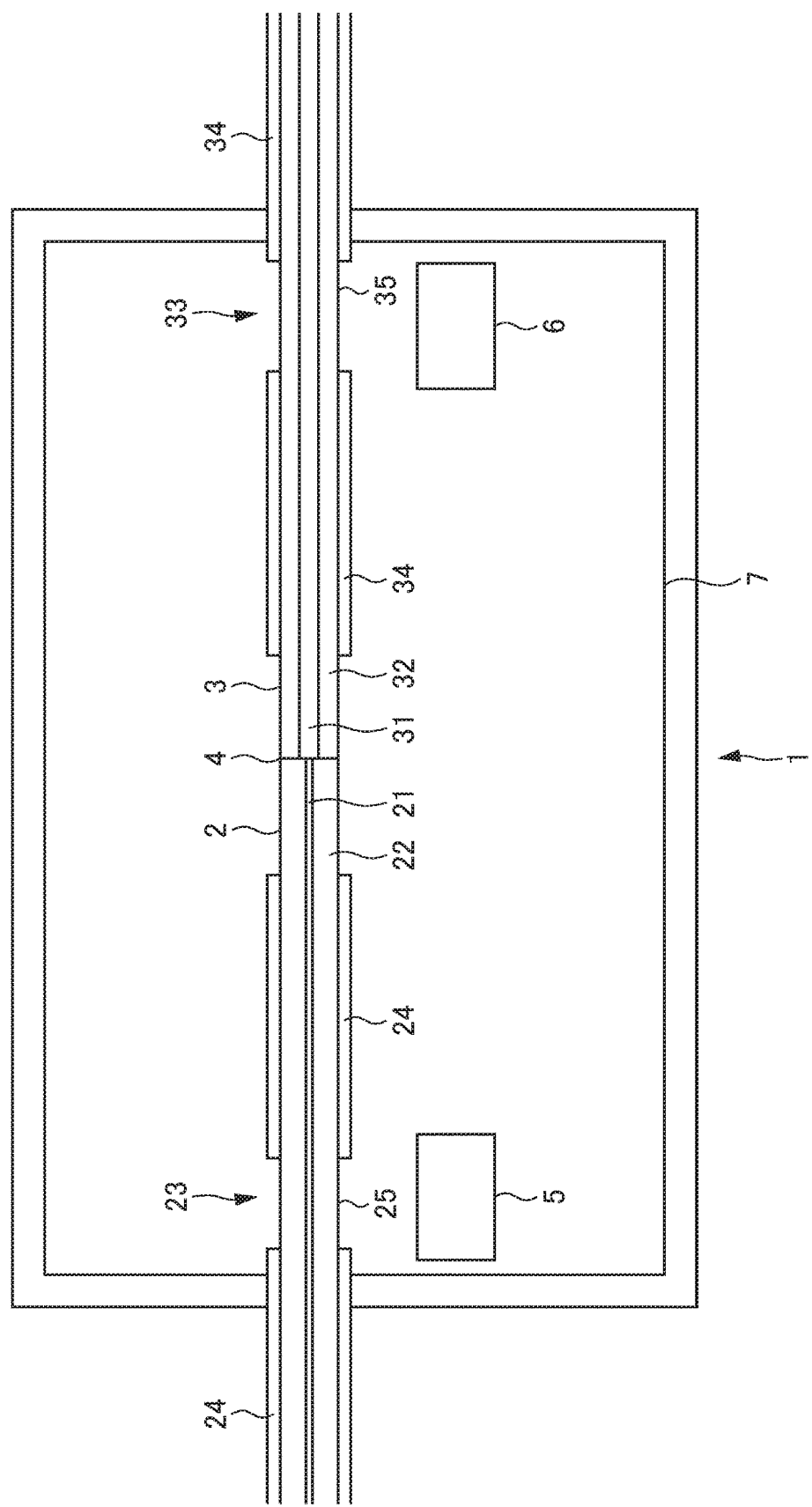
FIG. 8 is a block diagram showing the conceptual configuration of an optical power monitoring device according to a still different embodiment of the present invention.

FIG. 8 is a block diagram showing the conceptual configuration of an optical power monitoring device according to a still different embodiment of the present invention. An optical fiber section is shown in a schematic sectional view. As shown in FIG. 8, it is preferable that the optical power monitoring device 1 further include a heat dissipation member 7, and at least one of the first optical fiber 2, the second optical fiber 3, the connection part 4, the first leakage part 23, the second leakage part 33, the first photodetector 5, and the second photodetector 6 be arranged to be thermally connected to the heat dissipation member 7. Thermally connecting each part to the heat dissipation member 7 reduces temperature increase of this part caused by a leaking beam or a beam from the cladding 22 or 32 to be applied to the protection coating 24 or 34, for example, thereby increasing the reliability of the optical power monitoring device 1. Thermally connecting the first photodetector 5 or the second photodetector 6 to the heat dissipation member 7 stabilizes the temperature of the first photodetector 5 or the second photodetector 6. This reduces change in beam detection sensitivity, drift of an output value, etc. caused by the temperature change to increase beam detection accuracy.

The optical power monitoring device 1 becomes capable of detecting the occurrence of trouble such as heat generation due to failure by monitoring the temperature of the heat dissipation member 7 thermally connected to each part of the optical power monitoring device 1.

FIG. 8 shows the thermal connection between each part and one heat dissipation member 7. However, the heat dissipation member is not limited to one heat dissipation member but may be divided into multiple heat dissipation members. In FIG. 8, the heat dissipation member 7 is shown to be arranged in the optical power monitoring device 1 and shown as a heat dissipation member dedicated to the optical power monitoring device 1. However, the heat dissipation member 7 is not required to be used exclusively for the optical power monitoring device 1 but may also be used as a heat dissipation member for dissipating heat from a different heat generation part. For example, the heat dissipation member may specifically be a water-cooled heat sink.

Figure 9:
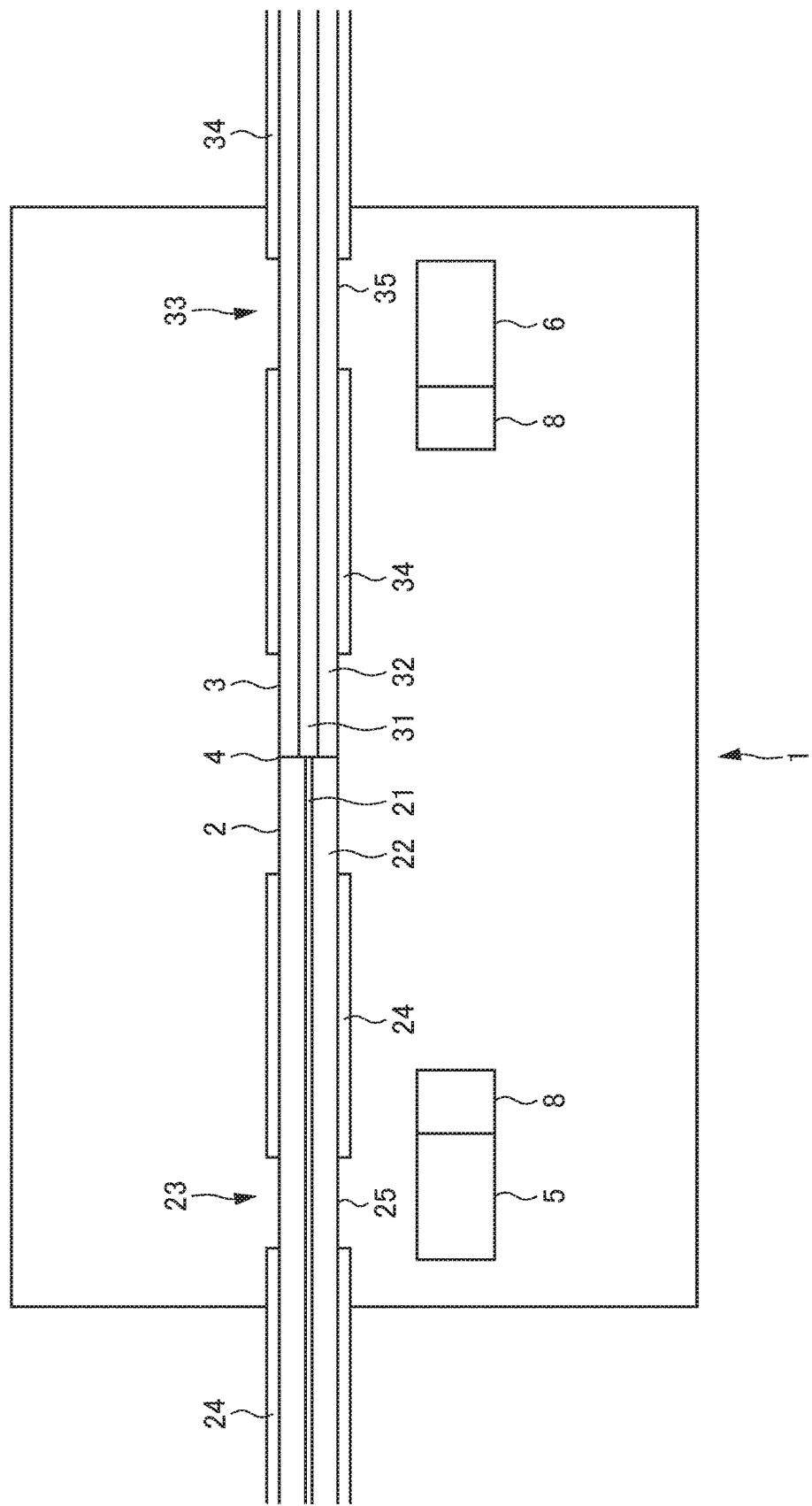
FIG. 9 is a block diagram showing the conceptual configuration of an optical power monitoring device according to a still different embodiment of the present invention.

FIG. 9 is a block diagram showing the conceptual configuration of an optical power monitoring device according to a still different embodiment of the present invention. An optical fiber section is shown in a schematic sectional view. As shown in FIG. 9, it is preferable that the optical power monitoring device 1 further include one or more temperature detectors 8, at least one of the first photodetector 5 and the second photodetector 6 be thermally connected to the temperature detector 8, and the temperature detector 8 be placed so as to allow detection of the temperature of a predetermined position of the first photodetector 5 or the second photodetector 6. This allows calibration of change in sensitivity or drift of an output value due to temperature change at a photodetector, so that a leaking beam can be detected with higher accuracy. The first photodetector 5 or the second photodetector 6 may be configured to be connected thermally to the temperature detector 8 and further connected thermally to the heat dissipation member 7 shown in FIG. 8, for example.

Figure 10:
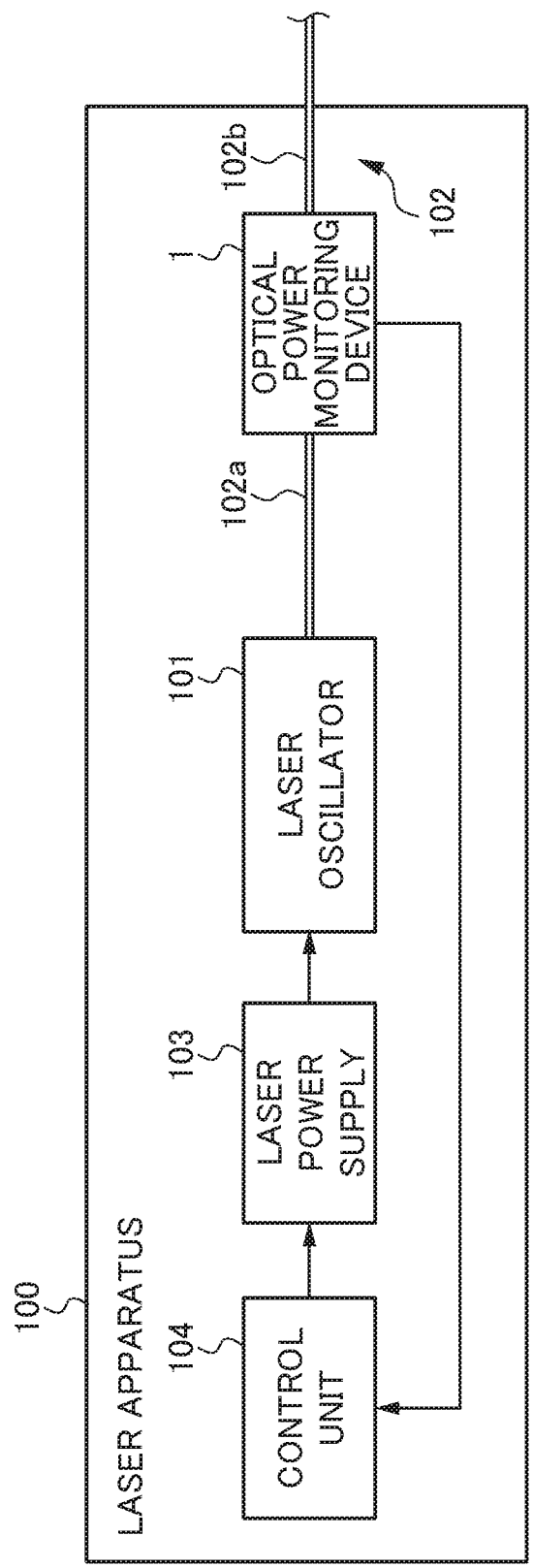
FIG. 10 is a block diagram showing the conceptual configuration of a laser apparatus according to an embodiment of the present invention.

FIG. 10 is a block diagram showing the conceptual configuration of a laser apparatus according to an embodiment of the present invention. A laser apparatus 100 shown in FIG. 10 includes the foregoing optical power monitoring device 1, a laser oscillator 101, an output optical fiber 102, a laser power supply 103, and a control unit 104. The output optical fiber 102 is for propagation of a laser output beam output from the laser oscillator 101 toward a laser beam output end (not shown in FIG. 10). The laser power supply 103 supplies driving power to the laser oscillator 101. The control unit 104 receives a detection signal output from each of the first photodetector 5 and the second photodetector 6 in the optical power monitoring device 1 (see FIG. 1, for example). The control unit 104 is capable of outputting an output command value to the laser power supply 103 instructing supply of driving power to the laser oscillator 101 based on the received detection signal. The specific configuration of the laser beam output end in the laser apparatus 100 is not particularly limited.

The output optical fiber 102 shown in FIG. 10 includes an input-side optical fiber 102a viewed from the optical power monitoring device 1 for propagation of a laser output beam output from the laser oscillator 101, and an output-side optical fiber 102b viewed from the optical power monitoring device 1 for propagation of the laser output beam from the optical power monitoring device 1 toward the laser beam output end. The optical power monitoring device 1 is installed at a point along the output optical fiber 102 in order for a laser output beam output from the laser oscillator 101 to propagate in a direction from the first optical fiber 2 toward the second optical fiber 3.

The optical power monitoring device 1 may be installed at a point along the output optical fiber 102 by a specific configuration of splicing the input-side optical fiber 102a of the output optical fiber 102 and the first optical fiber 2 in the optical power monitoring device 1 by fusing, for example, and splicing the output-side optical fiber 102b and the second optical fiber 3 in the optical power monitoring device 1 by fusing, for example. Alternatively, the input-side optical fiber 102a and the output-side optical fiber 102b may be used for forming the first optical fiber 2 and the second optical fiber 3 respectively in the optical power monitoring device 1.

Figure 11:
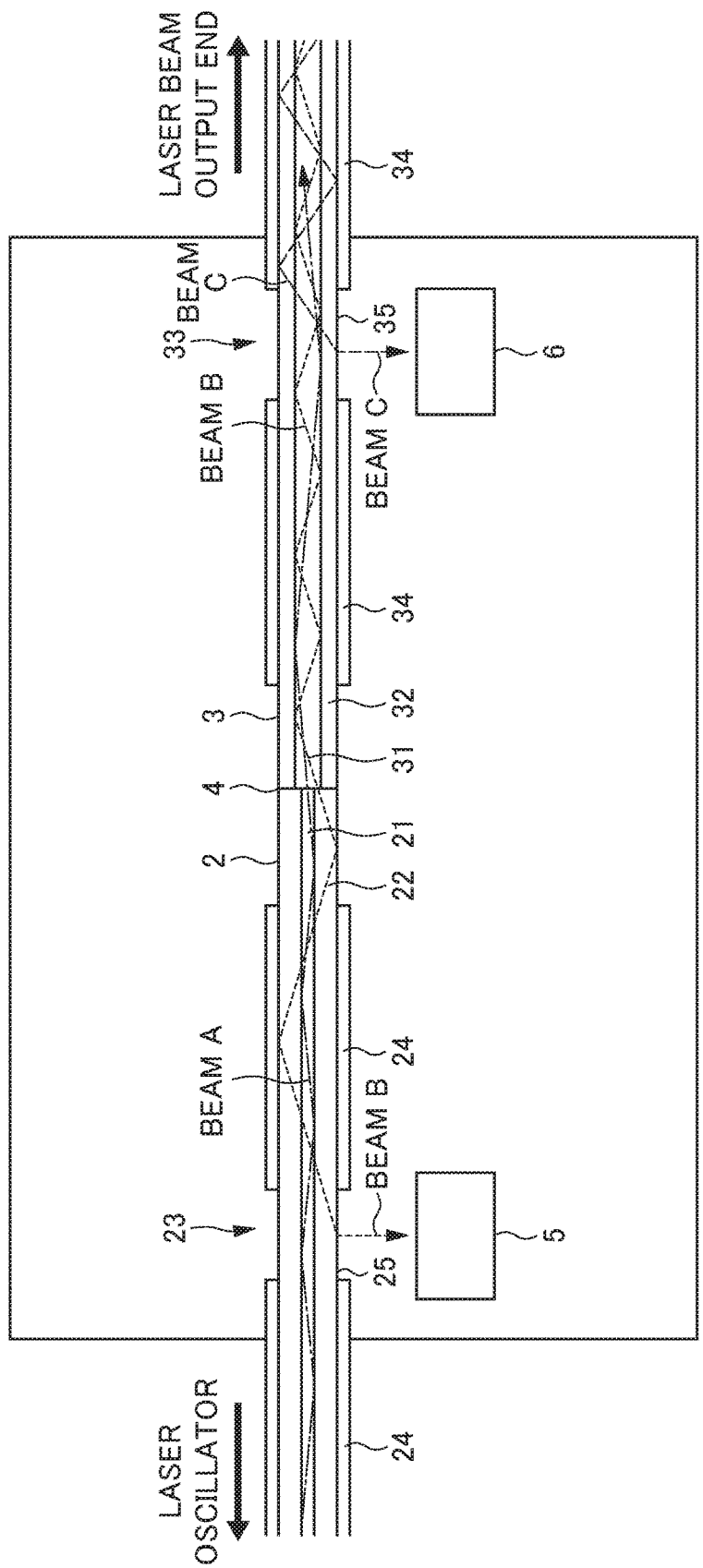
FIG. 11 shows how a laser output beam and a reflected beam propagate through the first optical fiber and the second optical fiber in the optical power monitoring device while the optical power monitoring device is installed at a point along an output optical fiber.

FIG. 11 shows how a laser output beam and a reflected beam propagate through the first optical fiber 2 and the second optical fiber 3 in the optical power monitoring device 1 while the optical power monitoring device 1 is installed at a point along the output optical fiber 102. A core diameter largely changes at the connection part 4 in the output direction of the laser beam. Thus, as shown in FIG. 11, regarding a laser output beam (beam A) having propagated from the laser oscillator 101 through the core 21 of the first optical fiber 2, the proportion of an optical power leaking at the connection part 4 from the core 21 of the first optical fiber 2 to the cladding 32 of the second optical fiber 3 is low. As a result, the laser output beam output from the laser oscillator 101 is allowed to pass through the optical power monitoring device 1 at low loss.

Regarding a reflected beam returning from the laser beam output end to the optical power monitoring device 1 after propagating through the output-side optical fiber 102b and having propagated through the core 31 of the second optical fiber 3 (beam B), this reflected beam is enclosed in the core 31 of the second optical fiber 3. Thus, substantially no leakage of this reflected beam occurs from the second leakage part 33 to the outside of the second optical fiber 3. Meanwhile, a core diameter is reduced at the connection part 4 in the propagation direction of the reflected beam. Thus, when this reflected beam propagates further to reach the connection part 4, a part of the reflected beam having failed to enter the core 21 of the first optical fiber 2 from the core 31 of the second optical fiber 3 leaks from the core 31 of the second optical fiber 3 to the cladding 22 of the first optical fiber 2 at the connection part 4. If the second optical fiber 3 has a large core diameter ratio to the core diameter of the first optical fiber 2, the reflected beam having propagated through the core 31 of the second optical fiber 3 leaks in an increased proportion of an optical power from the core 31 of the second optical fiber 3 to the cladding 22 of the first optical fiber 2. In this way, a significant proportion of the reflected beam is allowed to leak to the cladding 22 of the first optical fiber 2.

A part of a reflected beam propagating through the cladding 22 of the first optical fiber 2 in the optical power monitoring device 1 is absorbed by the core 21 of the first optical fiber 2 as this reflected beam propagates further toward the laser oscillator 101. Meanwhile, much of a reflected beam leaking from the core 31 of the second optical fiber 3 to the cladding 22 of the first optical fiber 2 at the connection part 4 propagates through the cladding 22 of the first optical fiber 2 to reach the first leakage part 23, because the first leakage part 23 is near the connection part 4. Thus, the reflected beam having leaked to the cladding 22 of the first optical fiber 2 leaks from the first leakage part 23 to the outside of the first optical fiber 2 and is then detected by the first photodetector 5. A result of this detection is output to the control unit 104. In a normal configuration, the proportion of the optical power of a reflected beam leaking from a core to a cladding is low. This makes it difficult to detect a reflected beam propagating through the core with high accuracy in an optical power monitoring device provided at the output optical fiber. By contrast, according to the present invention, the proportion of an optical power leaking from the core to the cladding can be increased for a reflected beam, so that a reflected beam propagating through the core 31 of the second optical fiber 3 can be detected with high accuracy.

Referring to a reflected beam (beam C) having propagated through the cladding 32 of the second optical fiber 3, as a result of the propagation through the cladding 32, this reflected beam easily leaks from the second leakage part 33 to the outside of the second optical fiber 3 and can be detected by the second photodetector 6 with high accuracy. A result of this detection is output to the control unit 104. The reflected beam having propagated through the cladding 32 of the second optical fiber 3 does not leak entirely to the outside of the second optical fiber 3 at the second leakage part 33 but part of this reflected beam passes through the connection part 4 to propagate further to the cladding 22 of the first optical fiber 2. Then, this reflected beam may leak from the first leakage part 23 to the outside of the first optical fiber 2 and may be detected by the first photodetector 5. As described above, however, the second photodetector 6 hardly detects a beam having propagated through the core 31 of the second optical fiber 3 in a direction from the core 32 toward the first optical fiber 2. Thus, even if a result of detection by the first photodetector 5 contains a non-negligible amount of contribution by the beam having propagated through the cladding 32 of the second optical fiber 3 and then through the cladding 22 of the first optical fiber 2, this contribution can be calculated easily and influence by this contribution can be eliminated. Thus, the optical power monitoring device 1 is capable of detecting with high accuracy and distinguishably the optical power of a reflected beam having propagated through the core 31 of the second optical fiber 3 in a direction from core 31 toward the first optical fiber 2 and the optical power of a reflected beam having propagated through the cladding 32 of the second optical fiber 3 in a direction from cladding 32 toward the first optical fiber 2.

As a result, while a laser output beam is output from the laser beam output end, the optical power monitoring device 1 feeds a detection signal output from the first photodetector 5 or the second photodetector 6 in the optical power monitoring device 1 back to the control unit 104. The control unit 104 controls driving power adequately to be supplied from the laser power supply 103 to the laser oscillator 101. In this way, high laser output performance can be maintained while damage on the laser oscillator 101, the output optical fiber 102, etc. caused by a reflected beam can be prevented before it happens. As described above, the optical power monitoring device 1 is capable of monitoring with high accuracy and distinguishably a reflected beam power propagating through the core 31 of the second optical fiber 3 and a reflected beam power propagating through the cladding 32 of the second optical fiber 3. Thus, feeding results of the monitoring back to control over laser beam output properly allows output of a high-quality laser output beam and achieves a high-performance and highly-reliable configuration for a laser apparatus insusceptible to damage by a reflected beam.

As described above, the laser apparatus is capable of outputting a laser output beam at low loss. Further, regarding a reflected beam propagating in a direction from the second optical fiber 3 toward the first optical fiber 2 opposite the direction of the laser output beam, the laser apparatus detects with high accuracy and distinguishably the optical power of a reflected beam, having propagated through the core 31 of the second optical fiber 3, that damages the laser oscillator 101, etc., and the optical power of a reflected beam, having propagated through the cladding 32 of the second optical fiber 3, that causes overheating or burning of the protective coatings 24 and 34 of the optical fibers. By doing so, the laser apparatus becomes capable of controlling the laser output beam adequately while preventing damage by the reflected beams in consideration of the ways in which these reflected beams exert influences and the levels of the influences, thereby achieving the high reliability and high performance of the laser apparatus. The optical power monitoring device 1 can detect a reflected beam before the reflected beam reaches the laser oscillator 101. This allows control to reduce the reflected beam by reducing optical output more promptly, for example. This can reduce the risk of damage on the laser oscillator 101 to be caused by the reflected beam having propagated to reach the laser oscillator 101.

Figure 12:
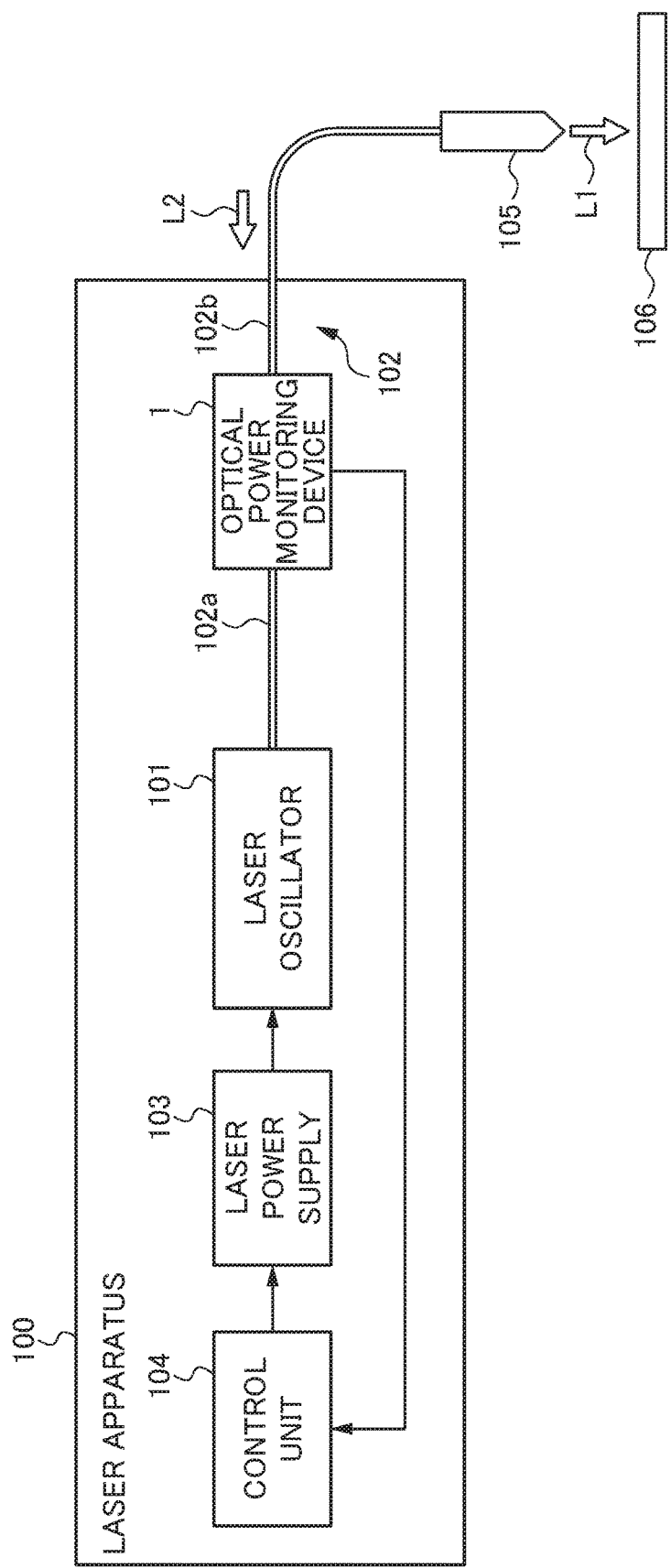
FIG. 12 is a block diagram showing the conceptual configuration of a laser apparatus according to a different embodiment of the present invention.

FIG. 12 is a block diagram showing the conceptual configuration of a laser apparatus according to a different embodiment of the present invention. The laser apparatus 100 shown in FIG. 12 is an example of a laser machining device that includes a machining head 105 as an example of a laser beam output end provided at the output optical fiber 102 and performs laser machining on a workpiece 106. Providing the foregoing optical power monitoring device 1 in this laser machining device allows output of a laser output beam at low loss. Regarding a reflected beam propagating in a direction from the second optical fiber 3 toward the first optical fiber 2 opposite the direction of the laser output beam, the optical power of a reflected beam, having propagated through the core 31 of the second optical fiber 3, that damages the laser oscillator 101, etc., and the optical power of a reflected beam, having propagated through the cladding 32 of the second optical fiber 3, that causes overheating or burning of the protective coatings 24 and 34 of the optical fibers, are distinguishably detected with high accuracy. Thus, while damage by the reflected beams is prevented in consideration of the ways in which these reflected beams exert influences and the levels of the influences, the control unit 104 becomes capable of controlling a laser output beam adequately so as not to cause defective parts due to more reduction in laser output than is necessary. As a result, the laser apparatus can be configured to have high reliability and high performance. The optical power monitoring device 1 can detect a reflected beam reflected from a surface of the workpiece 106 before the reflected beam reaches the laser oscillator 101. This allows the laser apparatus 100 to exert control to reduce the reflected beam by reducing optical output more promptly, for example. This can reduce the risk of damage on the laser oscillator 101 to be caused by the reflected beam having propagated to reach the laser oscillator 101.

In FIG. 12, a hollow arrow L1 schematically shows a laser output beam and a hollow arrow L2 schematically shows a reflected beam. The laser output beam is generally output so as to be focused on a position near the surface of the workpiece 106 by a focusing optical system in the machining head 105. In this regard, the hollow arrow L1 schematically shows the direction of the laser output beam output from the machining head 105. Meanwhile, the hollow arrow L2 is illustrated at a position outside the output optical fiber 102 for the sake of convenience to show the direction of the reflected beam propagating through the interior of the output optical fiber 102. The hollow arrow L2 merely shows the direction of the reflected beam schematically.

The laser oscillator 101 is not particularly limited but can be any laser oscillator capable of outputting a laser output beam having a wavelength that allows propagation through an optical fiber. Examples of a laser oscillator applicable to the laser oscillator 101 include a direct diode laser oscillator that produces a laser output beam from a laser beam output from a semiconductor laser, a fiber laser oscillator made from fiber and produces a laser beam from an excitation beam output from a semiconductor laser, and a solid-state laser oscillator such as an Nd:YAG laser oscillator that produces an laser beam from an excitation beam output from a semiconductor laser, etc. Except a fiber laser oscillator made from fiber, a laser oscillator requires an optical system for guiding a laser beam output from the laser oscillator to an optical fiber. In the present invention, regarding a laser oscillator requiring an optical system for guiding a beam to an optical fiber, a block for such a laser oscillator should be understood as containing the optical system for guiding a beam to an optical fiber.

Figure 13:
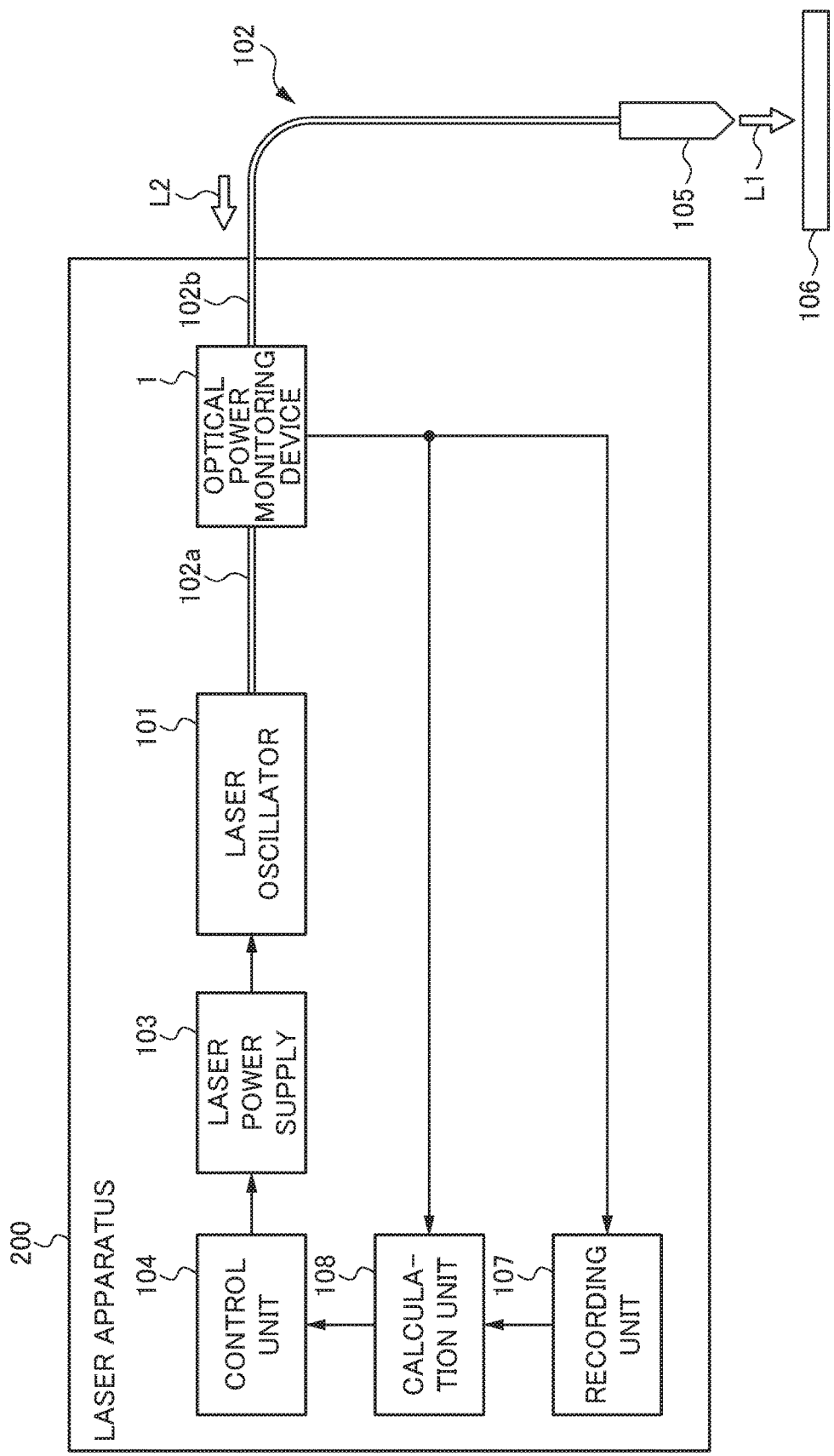
FIG. 13 is a block diagram showing the conceptual configuration of a laser apparatus according to a still different embodiment of the present invention.

FIG. 13 is a block diagram showing the conceptual configuration of a laser apparatus according to a still different embodiment of the present invention. A laser apparatus 200 shown in FIG. 13 includes a recording unit 107 and a calculation unit 108 in addition to the units of the laser apparatus 100 shown in FIG. 12. The recording unit 107 contains a first detection characteristic and a second detection characteristic recorded in advance. The first detection characteristic shows a relationship of a detection value obtained from the first photodetector 5 in the optical power monitoring device 1 with an output command value output from the control unit 104 to the laser power supply 103 in the absence of a reflected beam from the workpiece 106 as a laser machining target. The second detection characteristic shows a relationship of a detection value obtained from the second photodetector 6 in the optical power monitoring device 1 with the output command value output from the control unit 104 to the laser power supply 103 in the absence of a reflected beam from the workpiece 106. The calculation unit 108 calculates a first reflected beam power during laser machining based on a detection value obtained from the first photodetector 5 in the optical power monitoring device 1 relative to the output command value output from the control unit 104 to the laser power supply 103, and the first detection characteristic recorded in advance in the recording unit 107. Further, the calculation unit 108 calculates a second reflected beam power during the laser machining based on a detection value obtained from the second photodetector 6 in the optical power monitoring device 1 relative to the output command value output from the control unit 104 to the laser power supply 103, and the second detection characteristic recorded in advance in the recording unit 107. The calculation unit 108 outputs the calculated first reflected beam power and second reflected beam power to the control unit 104.

In the laser apparatus 200 shown in FIG. 13, at least one threshold is set individually for each of the reflected beam powers calculated by the calculation unit 108 including the first reflected beam power and the second reflected beam power. If the values of the first reflected beam power and the second reflected beam power exceed their thresholds, the control unit 104 instructs interruption of beam output as an output command value or operates so as to change the output command value by following a predetermined standard. The thresholds are set in advance at the control unit 104.

Figure 14A:
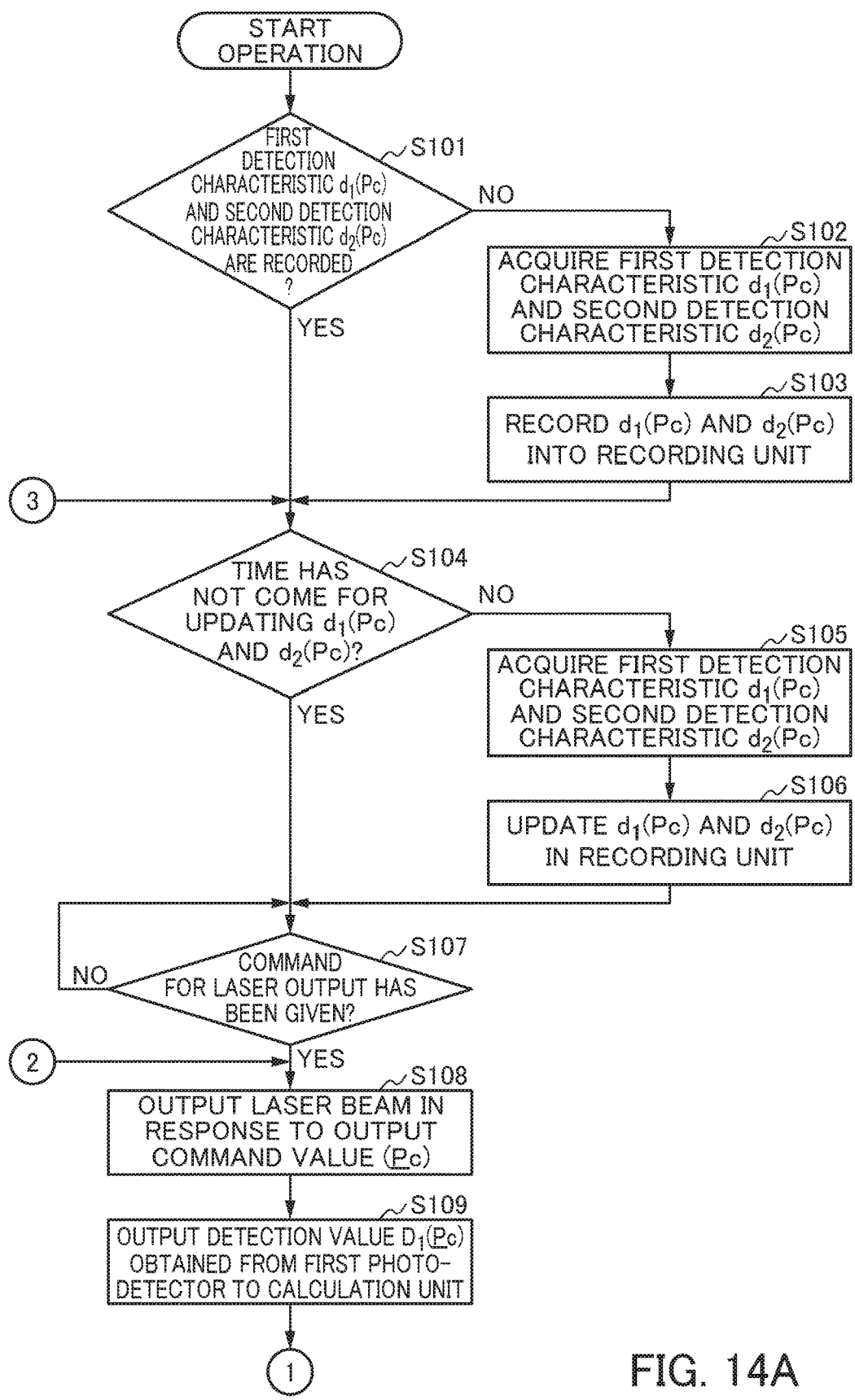
FIG. 14A is a flowchart showing an example of the operation of the laser apparatus shown in FIG. 13.
Figure 14B:
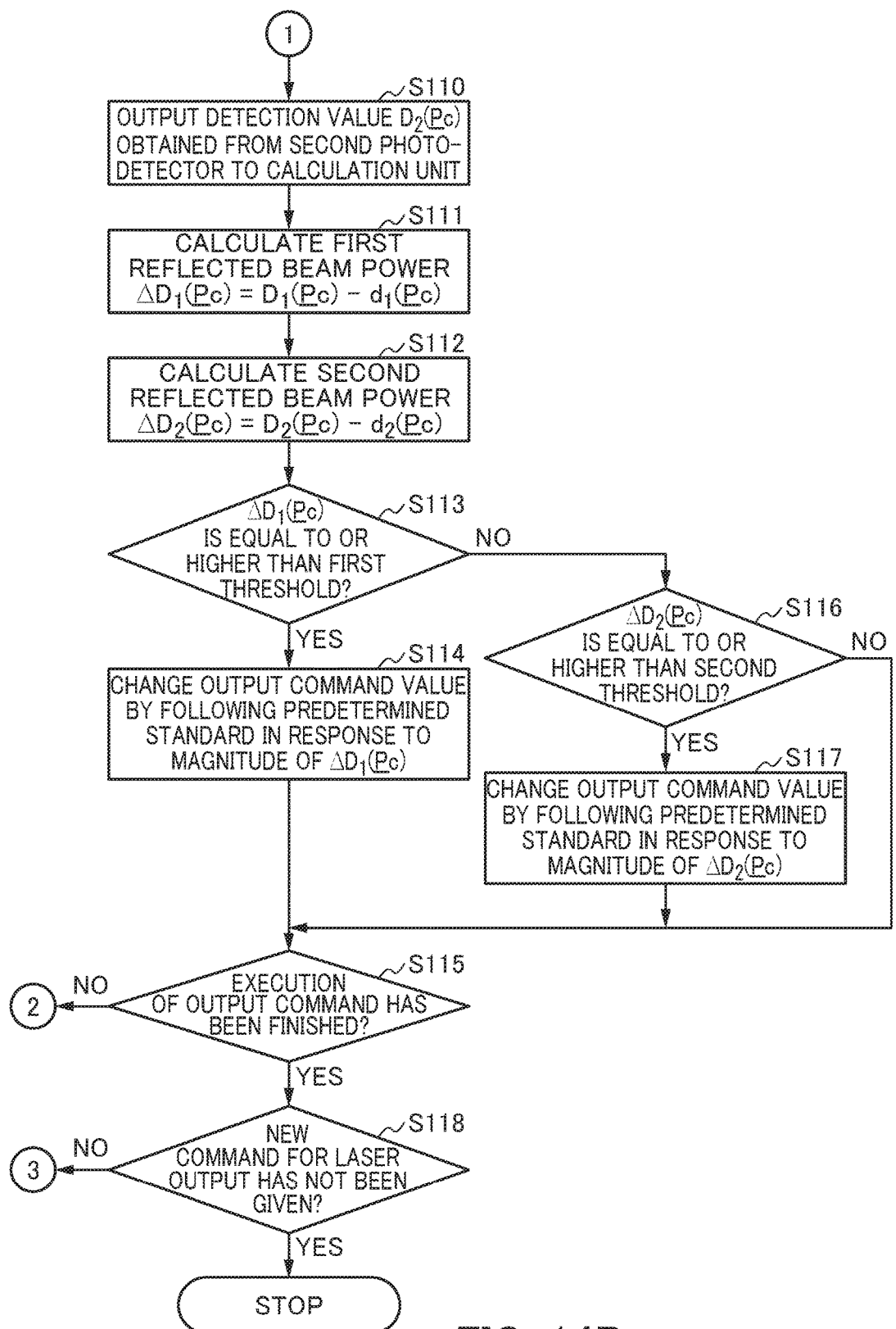
FIG. 14B is a flowchart showing the example of the operation of the laser apparatus shown in FIG. 13.

FIGS. 14A and 14B show a flowchart about an example of the operation of the laser apparatus 200 shown in FIG. 13. The example of the operation of the laser apparatus 200 will be described based on the flowchart in FIGS. 14A and 14B while referring to FIG. 13. The components of the optical power monitoring device 1 can be understood from FIG. 1. When the laser apparatus 200 is started, the control unit 104 first determines whether the recording unit 107 contains a first detection characteristic $d_1(P_c)$ and a second detection characteristic $d_2(P_c)$ (step S101). The first detection characteristic $d_1(P_c)$ shows a relationship of a detection value $d_1$ obtained from the first photodetector 5 in the optical power monitoring device 1 with an output command value $P_c$ output from the control unit 104 to the laser power supply 103 in the laser apparatus 200 in response to output of a laser beam in the absence of a reflected beam. The second detection characteristic $d_2(P_c)$ shows a relationship of a detection value $d_2$ obtained from the second photodetector 6 in the optical power monitoring device 1 with the same output command value $P_c$.

If the first detection characteristic $d_1(P_c)$ and the second detection characteristic $d_2(P_c)$ are determined not to be recorded, the control unit 104 produces a state without a reflected beam by a method such as provision of a blackbody adsorber to cause substantially no reflected beam instead of the workpiece 106. Then, the control unit 104 makes measurement to acquire the first detection characteristic $d_1(P_c)$ showing a relationship between the output command value $P_c$ and the detection value $d_1$ output from the first photodetector 5 in the optical power monitoring device 1, and the second detection characteristic $d_2(P_c)$ showing a relationship between the output command value $P_c$ and the detection value $d_2$ output from the second photodetector 6 in the optical power monitoring device 1 (step S102). Then, the control unit 104 records data about the acquired first detection characteristic $d_1(P_c)$ and second detection characteristic $d_2(P_c)$ into the recording unit 107 (step S103). Then, the flow proceeds to step S104.

Figure 15:
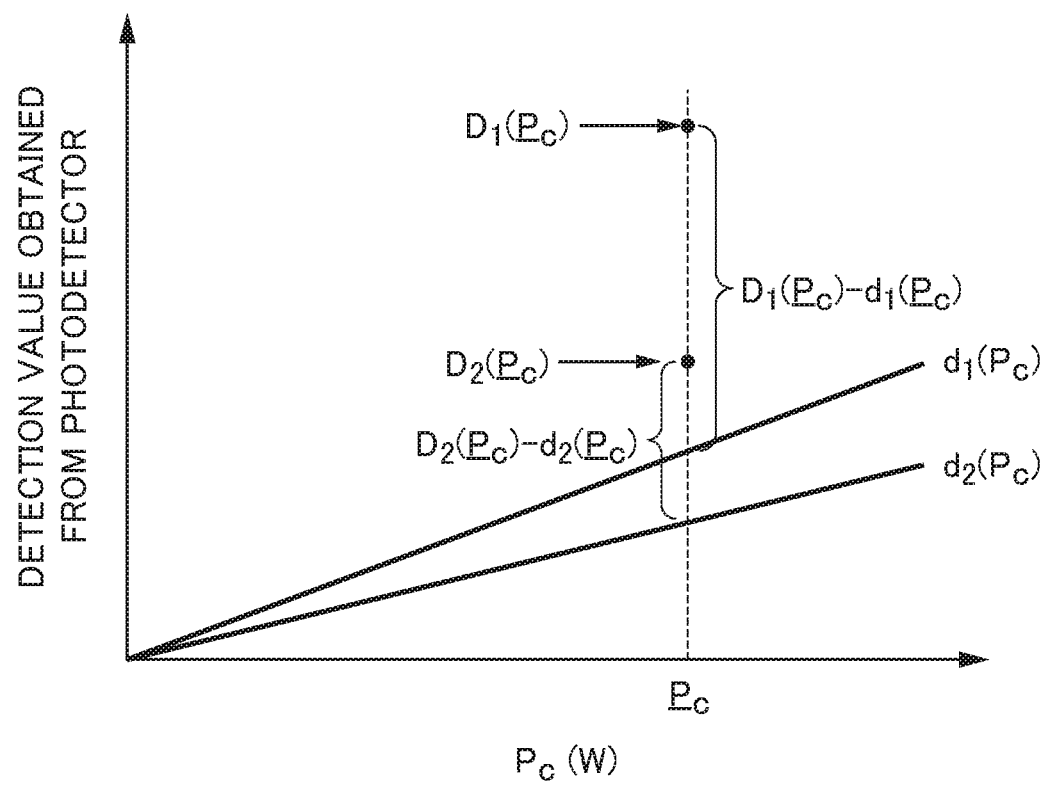
FIG. 15 is a graph showing a relationship between a detection value obtained from a photodetector and an output command value $P_c$ output to a laser power supply.

The first detection characteristic $d_1(P_c)$ and the second detection characteristic $d_2(P_c)$ recorded in the recording unit 107 are characteristic data indicating how the first detection characteristic $d_1(P_c)$ and the second detection characteristic $d_2(P_c)$ change in response to change in the output command value $P_c$. Thus, the first detection characteristic $d_1(P_c)$ and the second detection characteristic $d_2(P_c)$ may be recorded as approximate formulas using $d_1(P_c)$ and $d_2(P_c)$ as the functions of the variable $P_c$ or may be recorded in a data table format. FIG. 15 shows $d_1(P_c)$ and $d_2(P_c)$ as the simple linear functions of $P_c$.

As also understood from FIG. 15, in the optical power monitoring device 1 according to the present invention, the first photodetector 5 or the second photodetector 6 is available as an optical power monitoring for a laser output beam if the amount of a reflected beam is small. A laser output beam to propagate through an optical fiber having a small core diameter is in a stable mode similar to a single mode. Thus, the first photodetector 5 belonging to the optical fiber 2 of a small core diameter is particularly useful as an optical power detector for a laser output beam. During the foregoing measurement, in order to allow output of a laser beam power controlled more correctly, the absorber may be replaced by an optical power meter also causing low reflection, and a laser beam power to actually be output in response to the output command may be measured simultaneously.

Next, in step S104, the control unit 104 determines whether time has not come for updating the first detection characteristic $d_1(P_c)$ and the second detection characteristic $d_2(P_c)$. If the laser oscillator 101 is driven for a long time, a beam output characteristic may be changed. Thus, data about the first detection characteristic $d_1(P_c)$ and the second detection characteristic $d_2(P_c)$ is desirably updated by following a predetermined schedule. However, step S104 is not an absolute necessity in the present invention.

The schedule for updating data about the first detection characteristic $d_1(P_c)$ and the second detection characteristic $d_2(P_c)$ may be determined to match the timing of updating data indicating a relationship between an output command and a laser beam power to be output actually in response to the output command, and these updates may be made simultaneously. If it is determined in step S104 that time has come for the data update, like in step S102, the control unit 104 produces a state without a reflected beam and then acquires the first detection characteristic $d_1(P_c)$ and the second detection characteristic $d_2(P_c)$ by measurement (step S105). Further, the control unit 104 updates the first detection characteristic $d_1(P_c)$ and the second detection characteristic $d_2(P_c)$ recorded in advance in the recording unit 107 with the first detection characteristic $d_1(P_c)$ and the second detection characteristic $d_2(P_c)$ newly acquired (step S106). Then, the flow proceeds to step S107. If the first detection characteristic $d_1(P_c)$ and the second detection characteristic $d_2(P_c)$ are determined to be already recorded in step S101 performed first, the flow proceeds directly to step S104. If it is determined in step S104 that time has not come for updating data about the first detection characteristic $d_1(P_c)$ and the second detection characteristic $d_2(P_c)$, the flow proceeds directly to step S107.

In step S107, the control unit 104 determines whether a command for laser output has been given from a unit in the laser apparatus 200 not shown in the drawings such as an input unit. If a command for laser output has been given, the laser apparatus 200 outputs a laser beam in response to an output command value $\underline{P}_c$ (step S108). While the output command value $\underline{P}_c$ means a variable, an output command value output from the control unit 104 to the laser power supply 103 is indicated by $\underline{P}_c$ with underlined P for the purpose of distinction from the output command value $P_c$ as a variable. The output command value $\underline{P}_c$ is not limited to a constant value but may be a value to change with time or may be a pulse beam output command value.

When laser machining is started, a reflected beam reflected from the workpiece 106 starts to be detected by the first photodetector 5 and the second photodetector 6 in the optical power monitoring device 1. Then, the control unit 104 outputs a detection value $D_1(\underline{P}_c)$ obtained at the first photodetector 5 from the first photodetector 5 to the calculation unit 108 (step S109). Further, the control unit 104 outputs a detection value $D_2(\underline{P}_c)$ obtained at the second photodetector 6 from the second photodetector 6 to the calculation unit 108 (step S110). Next, the calculation unit 108 refers to the first detection characteristic $d_1(P_c)$ recorded in advance in the recording unit 107 to determine the first reflected beam power by calculating a difference from the detection value obtained from the first photodetector 5 as follows (step S111): $\Delta D_1(\underline{P}_c) = D_1(\underline{P}_c) - d_1(\underline{P}_c)$. Likewise, the calculation unit 108 refers to the second detection characteristic $d_2(P_c)$ recorded in advance in the recording unit 107 to determine the second reflected beam power by calculating a difference from the detection value obtained from the second photodetector 6 as follows (step S112): $\Delta D_2(\underline{P}_c) = D_2(\underline{P}_c) - d_2(\underline{P}_c)$.

As shown in FIG. 15, the first reflected beam power $\Delta D_1(\underline{P}_c) = D_1(\underline{P}_c) - d_1(\underline{P}_c)$ and the second reflected beam power $\Delta D_2(\underline{P}_c) = D_2(\underline{P}_c) - d_2(\underline{P}_c)$ respectively correspond to increase in the detection value obtained from the first photodetector 5 generated by the reflected beam and increase in the detection value obtained from the second photodetector 6 generated by the reflected beam and show results of detecting the reflected beam quantitatively. As described above, the first reflected beam power is determined by detecting the reflected beam having propagated through the core 31 of the second optical fiber 3 in the optical power monitoring device 1. The second reflected beam power is determined by detecting the reflected beam having propagated through the cladding 32 of the second optical fiber 3 in the optical power monitoring device 1.

Next, the control unit 104 determines whether or not the first reflected beam power $\Delta D_1(\underline{P}_c)$ is equal to or higher than a first threshold (step S113). If the first reflected beam power $\Delta D_1(\underline{P}_c)$ is determined to be equal to or higher the first threshold, the control unit 104 changes the output command value by following the predetermined standard in response to the magnitude of $\Delta D_1(\underline{P}_c)$ (step S114). After the control unit 104 changes the output command value for a predetermined period of time by following the predetermined standard, the control unit 104 determines whether or not execution of the output command has been finished (step S115). If execution of the output command has not been finished, the laser apparatus 200 returns to step S108 and continues the laser machining.

If the first reflected beam power $\Delta D_1(\underline{P}_c)$ is determined not to be equal to or higher the first threshold in step S113, the control unit 104 determines whether or not the second reflected beam power $\Delta D_2(\underline{P}_c)$ is equal to or higher than a second threshold (step S116). If the second reflected beam power $\Delta D_2(\underline{P}_c)$ is determined to be equal to or higher than the second threshold, the control unit 104 changes the output command value by following the predetermined standard in response to the magnitude of $\Delta D_2(\underline{P}_c)$ (step S117). Then, the flow proceeds to step S115. If the second reflected beam power $\Delta D_2(\underline{P}_c)$ is determined not to be equal to or higher than the second threshold in step S116, the flow proceeds directly to step S115. In step S115, if it is determined that execution of the output command has been finished, the control unit 104 determines whether or not a new command for laser output has been given (step S118). If a new command for laser output has been given, the flow returns to step S104. If a new command for laser output has not been given, the laser apparatus 200 stops.

As described above, in the laser apparatus 200 shown in FIG. 13, thresholds are set individually for a reflected beam, propagating through the core 31 of the second optical fiber 3, that is likely to cause damage on the laser oscillator 101 and a reflected beam, propagating through the cladding 32 of the second optical fiber 3, that is not to exert serious influence on the laser oscillator 101 while exerting influence on an external optical system such as the protecting coatings 24 and 34 of the optical fibers. Thus, operating the laser apparatus 200 by following the foregoing flowchart from steps S101 to S118 makes it possible to prevent the occurrence of a situation properly such as failing to perform high-quality laser machining on the workpiece 106 due to reduction of beam output which is excessive or more than necessary, or conversely, causing damage on the laser apparatus 200 due to insufficient response to a reflected beam. Regarding the flow from step S108 to step S117, the steps can be performed in a changed order. For example, calculation of the first reflected beam power, determination based on a result of the calculation, and an action to be taken based on the determination may be finished before calculation of the second reflected beam power.

The foregoing operation of the laser apparatus 200 may be modified as follows.

First Modification

Regarding detection of a reflected beam in the optical power monitoring device 1, the second photodetector 6 detects a reflected beam propagating through the cladding 32 of the second optical fiber 3 and hardly detects a reflected beam having propagated through the core 31. Meanwhile, the first photodetector 5 mainly detects the reflected beam having propagated through the core 31 of the second optical fiber 3. The reflected beam having propagated through the cladding 32 of the second optical fiber 3 may also be detected by the first photodetector 5. Thus, in order to eliminate a contribution by the reflected beam having propagated through the cladding 32 of the second optical fiber 3 from the first reflected beam power, the calculation unit 108 may calculate the first reflected beam power as follows: $\Delta D_1(\underline{P}_c) = D_1(\underline{P}_c) - d_1(\underline{P}_c) - k \times \{D_2(\underline{P}_c) - d_2(\underline{P}_c)\}$. In this formula, k is a positive number of generally one or less and can be obtained based on a ratio between a detection value obtained from the first photodetector 5 and a detection value obtained from the second photodetector 6 determined in response to entry of a laser beam from a different laser apparatus into a cladding through an output end.

Second Modification

A reflected beam detected by the first photodetector 5 or the second photodetector 6 in the optical power monitoring device 1 is a part of an entire reflected beam. In this regard, the laser apparatus 200 may measure a detection value obtained from the first photodetector 5 and a detection value obtained from the second photodetector 6 that are determined in response to entry of a laser beam from a different laser apparatus having a known power into the core 31 and the cladding 32 of the second optical fiber 3 through an output end. The laser apparatus 200 may determine the power of an entire reflected beam propagating through the core 31 of the second optical fiber 3 and that of an entire reflected beam propagating through the cladding 32 of the second optical fiber 3 by conversion from the respective detection values obtained from the first photodetector 5 and the second photodetector 6. Then, the laser apparatus 200 may set a threshold for each of the power of the entire reflected beam propagating through the core 31 and that of the entire reflected beam propagating through the cladding 32.

Third Modification

A threshold for each of the first reflected beam power and the second reflected beam power is not limited to one numerical value. Multiple thresholds may be set for one reflected beam power. This allows the laser apparatus 200 to operate so as to reduce laser beam output if a first threshold is exceeded and to interrupt laser beam output if a second threshold is exceed, for example.

Fourth Modification

A threshold to be set is not limited to a fixed numerical value. If a period where a reflected beam power exceeds a predetermined threshold becomes equal to or exceeds a predetermined period, an output command may be changed. Alternatively, if an average of the reflected beam power in a predetermined length of time exceeds a predetermined threshold, an output command may be changed.

Fifth Modification

A threshold may be set for a function $F(\Delta D_1(P_c), \Delta D_2(P_c))$ using both the first reflected beam power and the second reflected beam power as variables. If this function exceeds the threshold, the control unit 104 may change an output command value by following a predetermined standard. For example, if a reflected beam propagating through the core 31 of the second optical fiber 3 is to influence the laser apparatus 200 more adversely and an increase in the power of the reflected beam propagating through the core 31 increases the adverse influence progressively, a threshold may be set for the following function in order to make the magnitude of the first reflected beam power more influential: $F(\Delta D_1(P_c), \Delta D_2(P_c)) = \{\Delta D_1(P_c) - k \times \Delta D_2(P_c)\}^2 + m \times \Delta D_2(P_c)$.

Figure 16A:
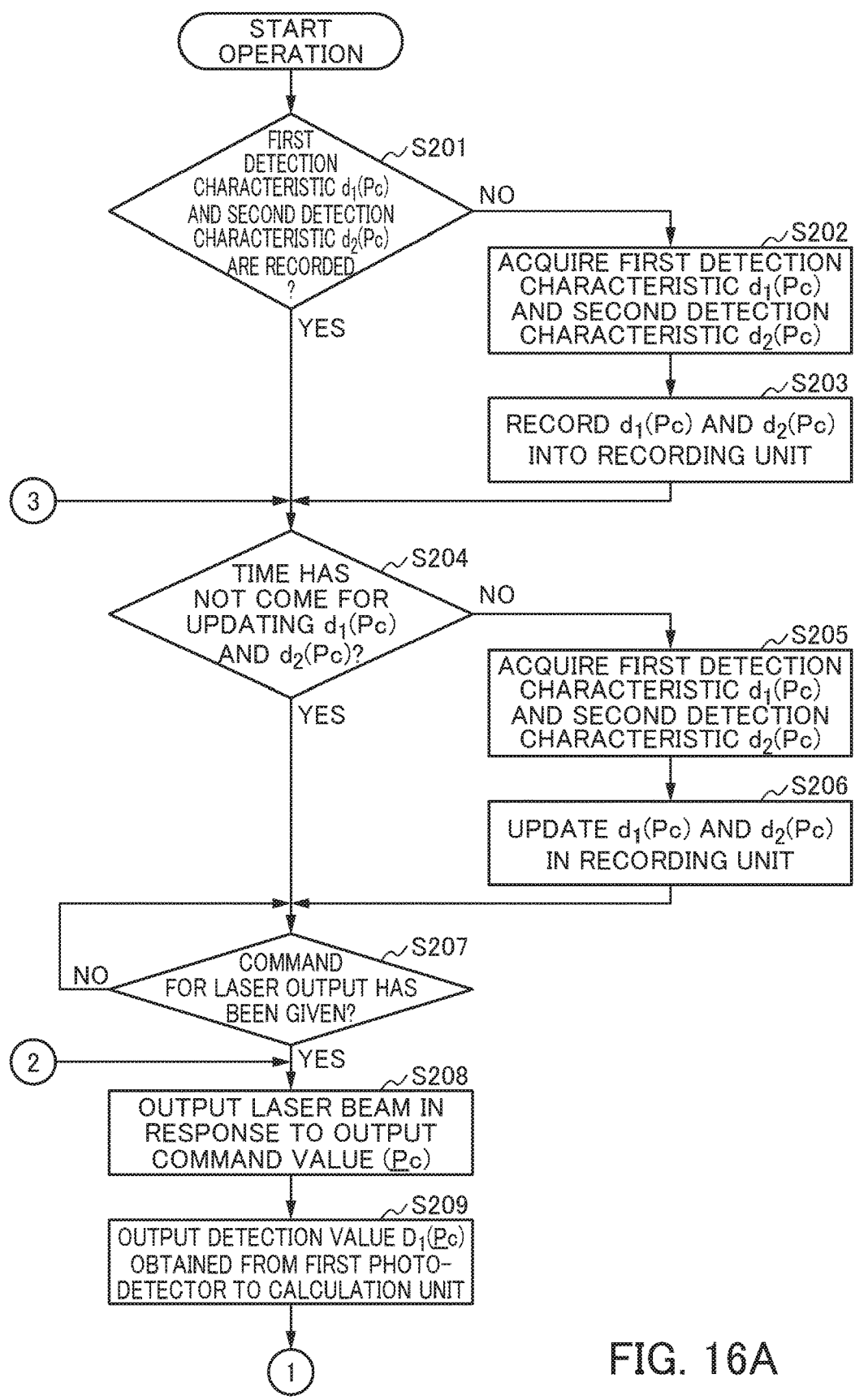
FIG. 16A is a flowchart showing a modification of the operation of the laser apparatus shown in FIG. 13.
Figure 16B:
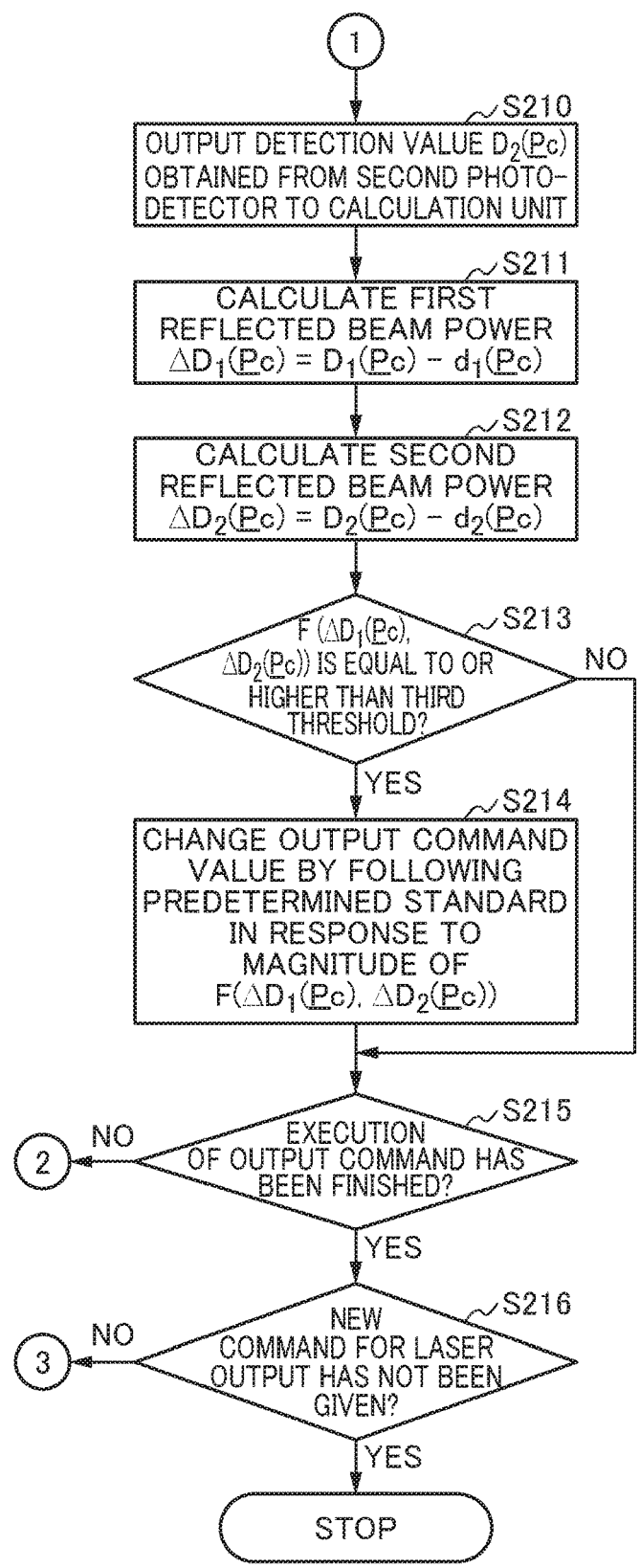
FIG. 16B is a flowchart showing the modification of the operation of the laser apparatus shown in FIG. 13.

In this case, the flowchart shown in FIGS. 14A and 14B should be modified slightly to the flowchart in FIGS. 16A and 16B. The flowchart in FIGS. 16A and 16B differs from the flowchart in FIGS. 14A and 14B in that the flow from step S113 to step S117 in the flowchart of FIG. 14B is replaced by step S213 and step S214 in the flowchart of FIG. 16B. Specifically, the control unit 104 determines whether or not a function $F(\Delta D_1(\underline{P}_c), \Delta D_2(\underline{P}_c))$ using both the first reflected beam power and the second reflected beam power as variables is equal to or higher than a third threshold (step S213). If the function $F(\Delta D_1(\underline{P}_c), \Delta D_2(\underline{P}_c))$ is equal to or higher than the third threshold, the control unit 104 changes an output command by following a predetermined standard in response to the magnitude of $F(\Delta D_1(\underline{P}_c), \Delta D_2(\underline{P}_c))$ (step S214). Then, the flow proceeds to step S215. If $F(\Delta D_1(\underline{P}_c), \Delta D_2(\underline{P}_c))$ is determined not to be equal to or higher than the threshold as a result of the determination in step S213, the laser apparatus 200 proceeds directly to step S215.

Figure 17:
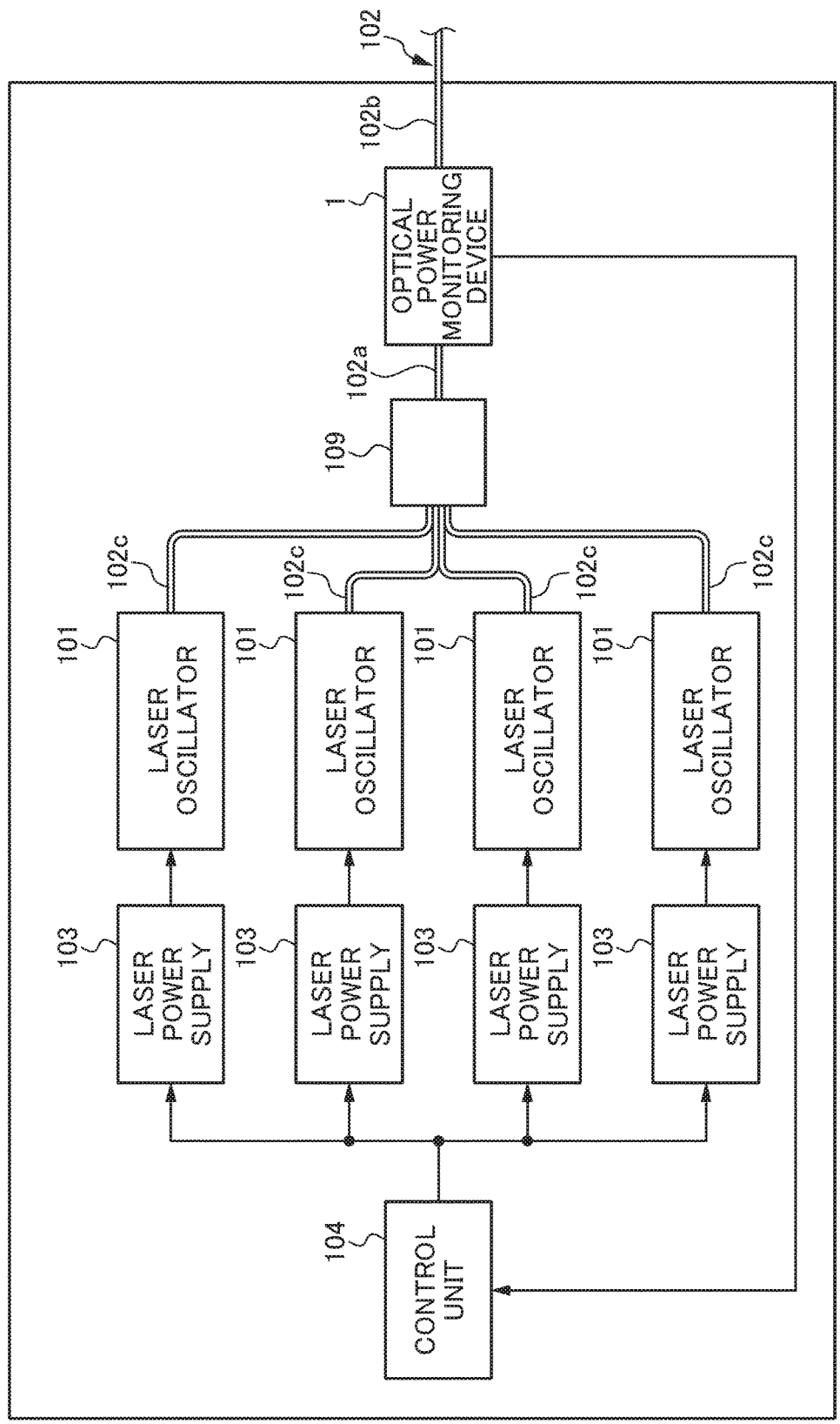
FIG. 17 is a block diagram showing the conceptual configuration of a laser apparatus according to a still different embodiment of the present invention.

FIG. 17 is a block diagram showing the conceptual configuration of a laser apparatus according to a still different embodiment of the present invention. The components of the optical power monitoring device 1 can be understood from FIG. 1. A laser apparatus 300 shown in FIG. 17 includes multiple laser oscillators 101. The laser power supply 103 for supplying driving power to the laser oscillator 101 also includes multiple laser power supplies 103 provided for corresponding ones of the laser oscillators 101. The laser apparatus 300 includes one beam combiner 109 for optically coupling multiple laser beams. Laser output beams output from the corresponding laser oscillators 101 propagate through individual optical fibers 102c. Then, these laser output beams from the corresponding laser oscillators 101 are coupled by the beam combiner 109. A laser output beam resulting from the optical coupling by the beam combiner 109 propagates toward a laser beam output end such as a machining head not shown in the drawing through the input-side optical fiber 102a and the output-side optical fiber 102b in the optical power monitoring device 1. In this way, a high-output laser beam is output. The optical power monitoring device 1 is installed at a point along a place of the output optical fiber 102 connecting the beam combiner 109 and the laser beam output end in order for a laser output beam output from the beam combiner 109 toward the laser beam output end to propagate in a direction from the first optical fiber 2 toward the second optical fiber 3. In this case, a specific configuration similar to the configuration for the optical power monitoring device 1 shown in FIG. 10 is applicable for installing the optical power monitoring device 1 at a point along the output optical fiber 102.

As described above, in the high-power laser apparatus including the multiple laser oscillators 101, the optical power monitoring device 1 is installed at a position closer to the laser beam output end than the beam combiner 109. By doing so, even with the use of one optical power monitoring device 1, damage on the beam combiner 109 or on the multiple laser oscillators 101 by a reflected beam can still be prevented.

Like the laser apparatus 200 shown in FIG. 13, the laser apparatus 300 shown in FIG. 17 where the beam combiner 109 optically couples multiple laser output beams from the multiple laser oscillators 101 may include the recording unit 107 and the calculation unit 108, and may be operated by following a flowchart comparable to the flowchart shown in FIGS. 14A and 14B or the flowchart shown in FIGS. 16A and 16B.

EXPLANATION OF REFERENCE NUMERALS

1 Optical power monitoring device
2 First optical fiber
21 Core
22 Cladding
23 First leakage part
24 Protection coating
25 Protection coating removed part
26 Bent section
3 Second optical fiber
31 Core
32 Cladding
33 Second leakage part
34 Protection coating
35 Protection coating removed part
4 Connection part
5 First photodetector
6 Second photodetector
7 Heat dissipation member
8 Temperature detector
100, 200, 300 Laser apparatus
101 Laser oscillator
102 Output optical fiber
103 Laser power supply
104 Control unit
107 Recording unit
108 Calculation unit
109 Beam combiner

What is claimed is:

1. An optical power monitoring device that detects an optical power propagating through an optical fiber including at least a core and a cladding, comprising:
a first optical fiber including a first protection coating;
a second optical fiber having a larger core diameter than the first optical fiber, the second optical fiber including a second protection coating;
a connection part where an end surface of the first optical fiber and an end surface of the second optical fiber are spliced;
a first leakage part for leakage of a beam from the first optical fiber to the outside, the first protection coating extending to the first leakage part and extending from the first leakage part toward the connection part;
a second leakage part for leakage of a beam from the second optical fiber to the outside, the second protection coating extending to the second leakage part and extending from the second leakage part toward the connection part;
a first photodetector that detects an optical power leaking from the first leakage part; and
a second photodetector that detects an optical power leaking from the second leakage part, wherein
the optical power monitoring device is installed at a point along the output optical fiber of a laser apparatus in order for a laser output beam output from the laser oscillator to propagate in a direction from the first optical fiber toward the second optical fiber,
the laser apparatus comprising:
a laser oscillator;
an output optical fiber for propagation of a laser output beam output from the laser oscillator toward a laser beam output end;
a laser power supply that supplies driving power to the laser oscillator;
a control unit that receives a detection signal output from each of the first photodetector and the second photodetector in the optical power monitoring device, and outputs an output command value to the laser power supply instructing supply of driving power to the laser oscillator;
a recording unit containing the first detection characteristic showing a relationship of a detection value obtained from the first photodetector with an output command value from the control unit in the absence of a reflected beam from a workpiece as a laser machining target and a second detection characteristic showing a relationship of a detection value obtained from the second photodetector with the output command value from the control unit in the absence of a reflected beam from the workpiece; and
a calculation unit calculating a first reflected beam power during laser machining based on a detection value obtained from the first photodetector relative to the output command value from the control unit and the first detection characteristic, and a second reflected beam power during the laser machining based on a detection value obtained from the second photodetector relative to the output command value from the control unit and the second detection characteristic, wherein
at least one threshold is set individually for each of the first reflected beam power and the second reflected beam power calculated by the calculation unit, and if the threshold is exceeded, the control unit instructs interruption of beam output or operates so as to change the output command value by following a predetermined standard.

2. The optical power monitoring device according to claim 1, further comprising a heat dissipation member, wherein
at least one of the first optical fiber, the second optical fiber, the connection part, the first leakage part, the second leakage part, the first photodetector, and the second photodetector is thermally connected to the heat dissipation member.

3. The optical power monitoring device according to claim 1, further comprising one or more temperature detectors, wherein
at least one of the first photodetector and the second photodetector is thermally connected to the one or more temperature detectors.

4. An optical power monitoring device that detects an optical power propagating through an optical fiber including at least a core and a cladding, comprising:
a first optical fiber;

a second optical fiber having a larger core diameter than the first optical fiber;

a connection part where an end surface of the first optical fiber and an end surface of the second optical fiber are spliced;

a first leakage part for leakage of a beam from the first optical fiber to the outside;

a second leakage part for leakage of a beam from the second optical fiber to the outside;

a first photodetector that detects an optical power leaking from the first leakage part; and a second photodetector that detects an optical power leaking from the second leakage part, wherein the optical power monitoring device is installed at a point along an output optical fiber of a laser apparatus in order for a laser output beam output from a laser oscillator to propagate in a direction from the first optical fiber toward the second optical fiber, the laser apparatus comprising at least:

a laser oscillator;

an output optical fiber for propagation of a laser output beam output from the laser oscillator toward a laser beam output end;

a control unit that outputs an output command value instructing supply of driving power to the laser oscillator;

a recording unit that contains a first detection characteristic and a second detection characteristic recorded in advance, the first detection characteristic showing a relationship of a detection value obtained from the first photodetector with an output command value from the control unit in the absence of a reflected beam from a workpiece as a laser machining target, the second detection characteristic showing a relationship of a detection value obtained from the second photodetector with the output command value from the control unit in the absence of a reflected beam from the workpiece, a calculation unit that calculates a first reflected beam power during laser machining based on a detection value obtained from the first photodetector relative to the output command value from the control unit and the first detection characteristic, and a second reflected beam power during the laser machining based on a detection value obtained from the second photodetector relative to the output command value from the control unit and the second detection characteristic.

5. The optical power monitoring device according to claim 4, wherein the first leakage part and the second leakage part are formed by removal of a first protection coating and a second protection coating from the first optical fiber and the second optical fiber, respectively, at a location of the first leakage part and a location of the second leakage part, respectively, to expose a surface of the cladding at the location of the first leakage part and at the location of the second leakage part.

6. The optical power monitoring device according to claim 4, wherein each of the first photodetector and the second photodetector has a light-receiving surface provided at a position facing the first leakage part and the second leakage part, respectively.

7. The optical power monitoring device according to claim 5, wherein the surface of the cladding exposed from removal of the first protection coating and removal of the second protection coating is subjected at least partially to a cladding beam removal process for letting a beam propagating through the cladding out of the cladding.

8. The optical power monitoring device according to claim 4, wherein at least one of the first leakage part and the second leakage part includes a bent section.

9. The optical power monitoring device according to claim 4, wherein at least one of the first photodetector and the second photodetector includes multiple photodetectors.

10. The optical power monitoring device according to claim 9, wherein the multiple photodetectors include photodetectors having different wavelength sensitivities.

11. The optical power monitoring device according to claim 4, wherein at least one of the first photodetector and the second photodetector is a photodiode.

12. The optical power monitoring device according to claim 4, wherein the first leakage part and the second leakage part each include a protection coating removed part where a surface of the cladding is exposed by removing a protection coating from the first optical fiber and the second optical fiber.

13. The optical power monitoring device according to claim 4, further comprising a heat dissipation member, wherein
at least one of the first optical fiber, the second optical fiber, the connection part, the first leakage part, the second leakage part, the first photodetector, and the second photodetector is thermally connected to the heat dissipation member.

14. The optical power monitoring device according to claim 4, wherein at least one threshold is set individually for each of the first reflected beam power and the second reflected beam power calculated by the calculation unit, and if the threshold is exceeded, the control unit instructs interruption of beam output or operates so as to change an output command value by following a predetermined standard.

15. The optical power monitoring device according to claim 4, wherein the laser oscillator includes multiple laser oscillators,
the laser apparatus comprises a beam combiner that couples multiple laser output beams optically output from corresponding ones of the multiple laser oscillators, and
the optical power monitoring device is installed at a point along the output optical fiber in order for a laser output beam output from the beam combiner toward the laser beam output end to propagate in the direction from the first optical fiber toward the second optical fiber.

16. The optical power monitoring device according to claim 4, further comprising one or more temperature detectors, wherein
at least one of the first photodetector and the second photodetector is thermally connected to the one or more temperature detectors.

* * * * *